United States Patent
Good et al.

(10) Patent No.: US 11,154,010 B2
(45) Date of Patent: Oct. 26, 2021

(54) SYSTEM AND METHOD FOR AUTONOMOUS HARVESTING OF MUSHROOMS

(71) Applicant: Mycionics Inc., Putnam (CA)

(72) Inventors: Murray Good, Putnam (CA); Stefan Glibetic, Putnam (CA); Nikita Kuchinskiy, Putnam (CA); Mehrdad Kermani, Putnam (CA); Scott Hayden, Putnam (CA); John Phan, Putnam (CA)

(73) Assignee: Mycionics Inc., Putnam (CA)

( * ) Notice: Subject to any disclaimer, the term of this patent is extended or adjusted under 35 U.S.C. 154(b) by 0 days.

(21) Appl. No.: 15/733,562

(22) PCT Filed: Nov. 13, 2019

(86) PCT No.: PCT/CA2019/051619
§ 371 (c)(1),
(2) Date: Aug. 27, 2020

(87) PCT Pub. No.: WO2020/097727
PCT Pub. Date: May 22, 2020

(65) Prior Publication Data
US 2020/0404845 A1    Dec. 31, 2020

Related U.S. Application Data

(60) Provisional application No. 62/760,598, filed on Nov. 13, 2018.

(51) Int. Cl.
*A01D 46/30* (2006.01)
*A01G 18/70* (2018.01)
(Continued)

(52) U.S. Cl.
CPC ............. *A01D 46/30* (2013.01); *A01G 18/70* (2018.02); *B25J 9/026* (2013.01); *B25J 9/1697* (2013.01);
(Continued)

(58) Field of Classification Search
CPC ........ A01D 46/00; A01D 46/30; A01G 18/70; B25J 15/024; B25J 15/0475; B25J 19/022; B25J 9/026; B25J 9/1697
See application file for complete search history.

(56) References Cited

U.S. PATENT DOCUMENTS 5,058,368 A    10/1991  Wheeler
5,471,827 A    12/1995  Janssen
(Continued)

FOREIGN PATENT DOCUMENTS

AU    199531250         3/1996
CN    107046933 A       8/2017
(Continued)

OTHER PUBLICATIONS

Agricultural robots for field operations. Part 2: Operations and systems: Bechar et al. 19 pages; Available online @ https://www.sciencedirect.com/science/article/pii/S1537511015301926; last accessed Jun. 3, 2021 (Year: 2016).*

(Continued)

*Primary Examiner* — Behrang Badii
*Assistant Examiner* — Daniell L Greene
(74) *Attorney, Agent, or Firm* — CPST Intellectual Property Inc.; Brett J. Slaney

(57) ABSTRACT

Provided are a system, method(s), and apparatus for automatically harvesting mushrooms from a mushroom bed. The system, in one implementation, may be referred to herein as an "automated harvester", having at least an apparatus/frame/body/structure for supporting and positioning the har-
(Continued)

vester on a mushroom bed, a vision system for scanning and identifying mushrooms in the mushroom bed, a picking system for harvesting the mushrooms from the bed, and a control system for directing the picking system according to data acquired by the vision system. Various other components, sub-systems, and connected systems may also be integrated into or coupled to the automated harvester.

29 Claims, 34 Drawing Sheets

(51) Int. Cl.
  *B25J 9/02*     (2006.01)
  *B25J 9/16*     (2006.01)
  *B25J 15/02*    (2006.01)
  *B25J 15/04*    (2006.01)
  *B25J 19/02*    (2006.01)

(52) U.S. Cl.
  CPC ......... *B25J 15/024* (2013.01); *B25J 15/0475* (2013.01); *B25J 19/022* (2013.01)

(56) References Cited

U.S. PATENT DOCUMENTS

| | | | |
|---|---|---|---|
| 8,033,087 | B2 | 10/2011 | Rapila et al. |
| 9,730,394 | B2 | 8/2017 | Van de Vegt et al. |
| 9,974,235 | B2 | 5/2018 | Van de Vegt et al. |
| 10,371,683 | B2 | 8/2019 | McPeek |
| 2005/0268587 | A1 | 12/2005 | McKeown |
| 2005/0287255 | A1* | 12/2005 | Notermans ............... A23L 3/28 426/248 |
| 2009/0200815 | A1* | 8/2009 | Sugahara ............... B25J 13/082 294/106 |
| 2009/0320430 | A1* | 12/2009 | Rapila ................... A01G 18/70 56/121.4 |
| 2013/0340329 | A1* | 12/2013 | van den Top .......... A01G 18/60 47/1.1 |
| 2014/0277588 | A1* | 9/2014 | Patt ........................ A61F 2/583 623/57 |
| 2017/0042095 | A1* | 2/2017 | Van De Vegte ....... A01G 18/00 |
| 2017/0265392 | A1* | 9/2017 | Van De Vegte ..... B25J 15/0683 |
| 2018/0117773 | A1* | 5/2018 | Odhner .................. B25J 15/024 |
| 2018/0295783 | A1 | 10/2018 | Alexander et al. |
| 2019/0125126 | A1* | 5/2019 | Cohen .................... A47J 36/32 |
| 2019/0291277 | A1* | 9/2019 | Oleynik .................. B25J 9/163 |

FOREIGN PATENT DOCUMENTS

| | | |
|---|---|---|
| CN | 107094429 A | 8/2017 |
| CN | 108450245 A | 8/2018 |
| CN | 108605663 A | 10/2018 |
| CN | 108812086 A | 11/2018 |
| EP | 1810563 A1 | 7/2007 |
| EP | 2848120 A1 | 3/2015 |
| NL | 1028906 C2 | 10/2006 |
| WO | 1991011902 A1 | 8/1991 |
| WO | 2012161567 A1 | 11/2012 |

OTHER PUBLICATIONS

International Search Reporting issued in corresponding PCT Application No. PCT/CA2019/051619; search completed Dec. 16, 2019.
Supplemental European Search Report issued in corresponding EP Patent Application No. 19885549; search completed Feb. 12, 2021.

* cited by examiner

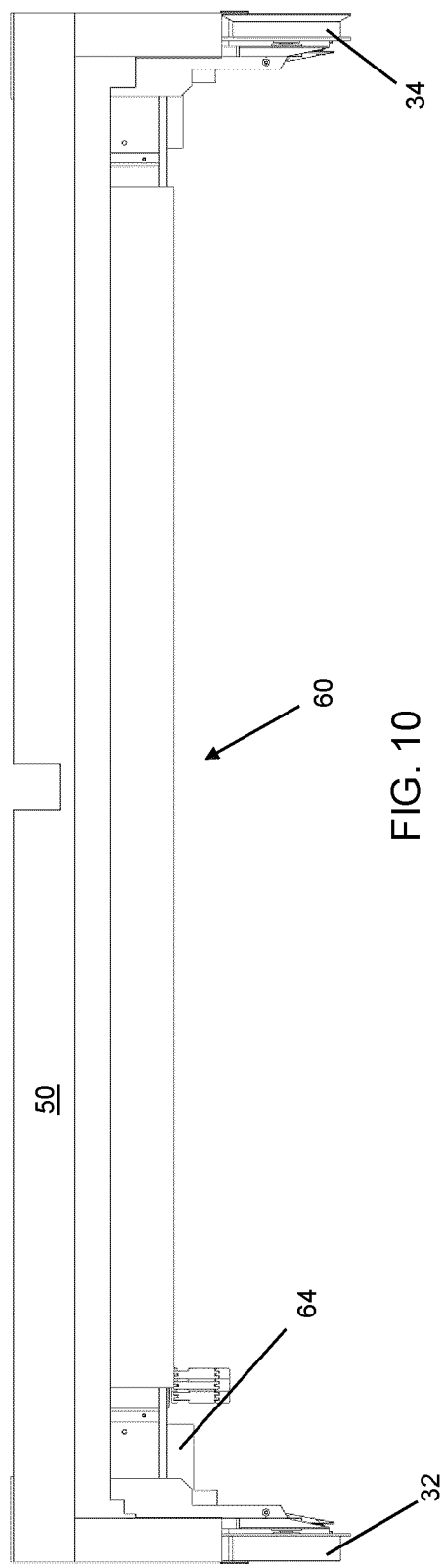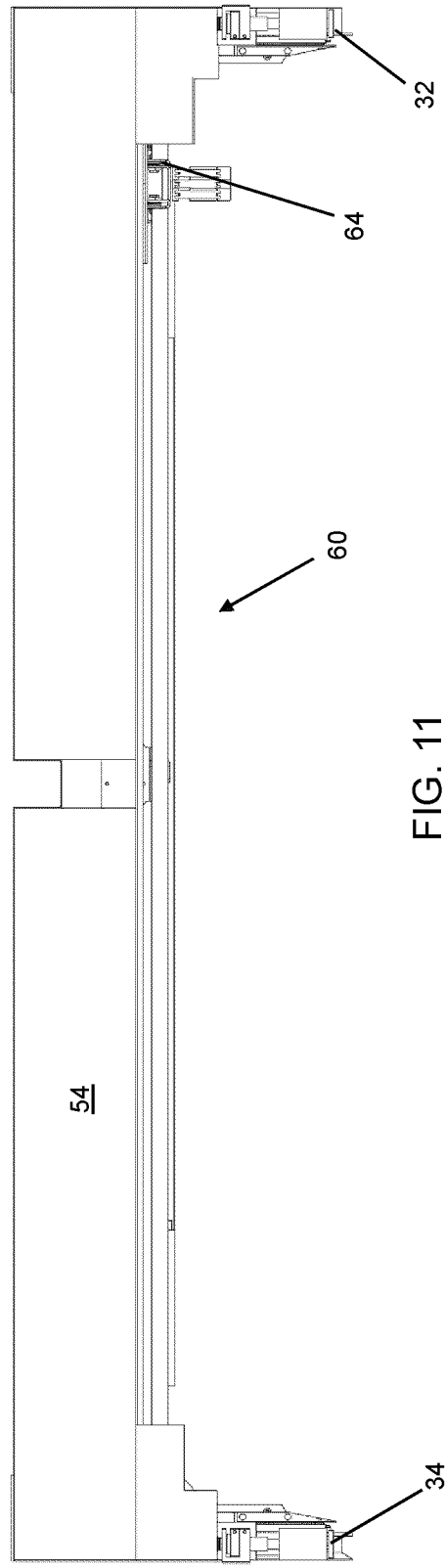

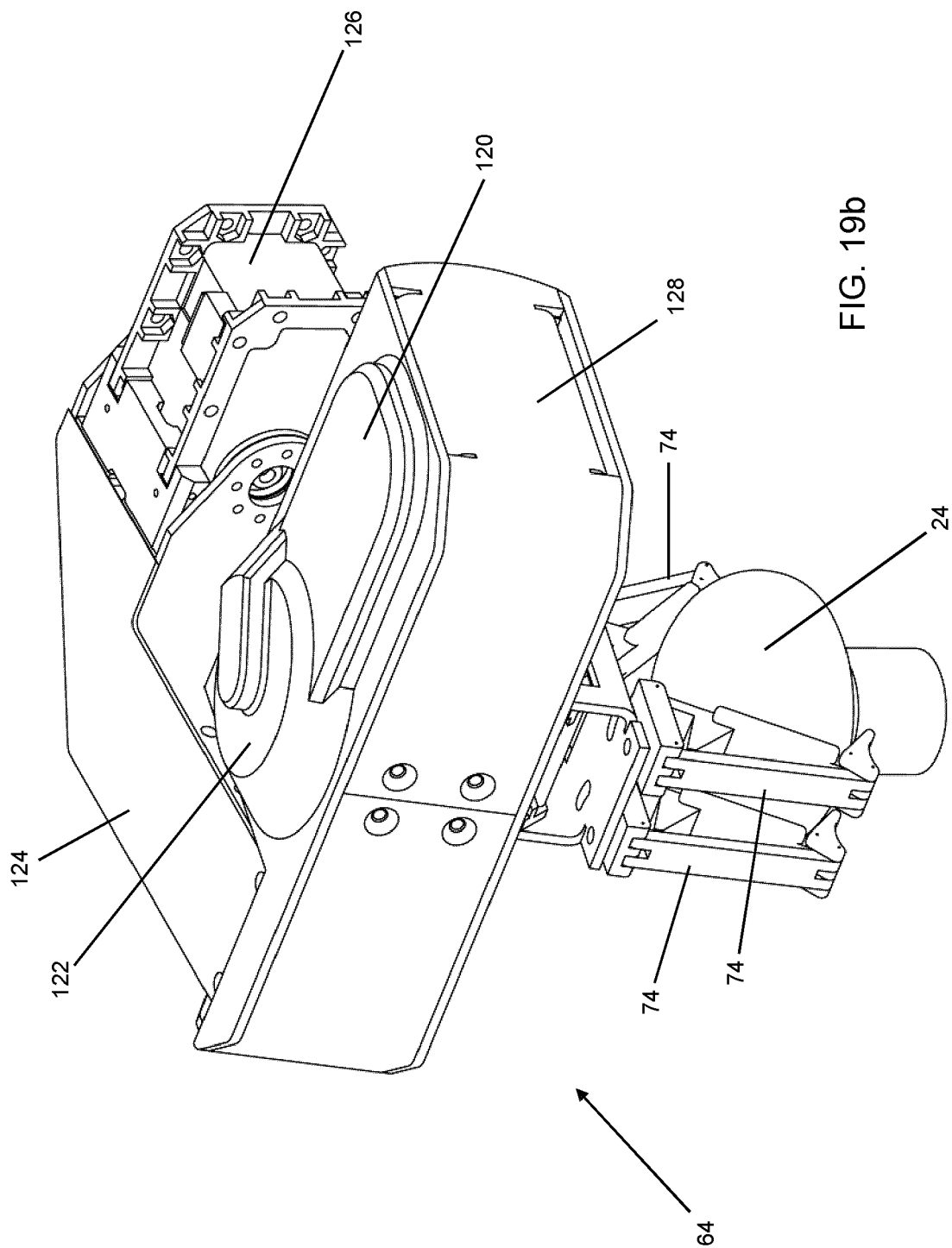

SYSTEM AND METHOD FOR AUTONOMOUS HARVESTING OF MUSHROOMS

CROSS-REFERENCE TO RELATED APPLICATION(S)

This application is a National Entry of PCT Application No. PCT/CA2019/051619, filed on Nov. 13, 2019, which claims priority to U.S. Provisional Patent Application No. 62/760,598 filed on Nov. 13, 2018. The entire contents of the aforementioned applications are incorporated herein by reference as if set forth in their entirety.

TECHNICAL FIELD

The following relates to systems, methods, and apparatus for autonomous harvesting of mushrooms.

BACKGROUND

The cultivation of *Agaricus bisporus* (i.e. mushrooms) is an intricate process that requires careful preparation of a substrate in multiple stages and the maintenance of precise environmental conditions during the growth and fruiting. The substrate (i.e. growing medium) used for cultivation is nutritious compost prepared in a special manner with a layer of casing at the top. The casing material should not have any nutrients and should possess good water holding capacity with a texture permitting good aeration and neutral pH level, which causes complex surface and large variation of its height. The casing soil needs to be layered on top of the compost infiltrated with mycelia. Harvesting is to be performed after every flush of growth, approximately every 7 to 10 days. Harvesting is required to be intensive yet accurate, since mushrooms approximately double their size and weight every 24 hours but do not become ripe at the same time. After reaching maturity, the mushroom needs to be quickly picked before the bottom of the mushroom's cap opens. Most of the crop might be harvested within the first two flushes from a single load of bed. One load might give up to four flushes. The growing beds then have to be emptied and sterilized, to kill pests, infections and molds.

*Agaricus bisporus* is usually grown in multilayer shelving growing bed system for efficient utilization of a farm space and for maximizing yields. This infrastructure allows reaching mushrooms on the whole surface from the sides of the bed by human pickers. The Dutch-type shelving was not designed to accommodate machinery within its boundaries. The beds used for growing mushrooms in the North American region (i.e., in approx. 90% of farms) are more or less standard. Usually, there are only about 16 centimeters of space between mushroom caps and the ceiling of the shelves that can be used for any picking apparatus should one be contemplated.

Currently, mushrooms intended for the fresh market are harvested by hand.

Although the standard grow bed system is suitable for manual harvesting, as previously stated, such systems leave little room for the introduction of automated methods of mushroom harvesting without modifying the infrastructure of the farm or the process of cultivation. For example, the limited vertical space between the stacked grow beds does not allow for the use of standard harvesting systems due to their large size and lack of portability. Additionally, the limited space creates difficulty for standard camera imaging systems as they can only see small portions of the growing bed or suffer from distortions and mushroom occlusions if oriented towards the bed at an angle. Furthermore, mushrooms and their growing environments experience highly dynamic properties while growing (e.g., varying ambient light sources, mushroom color, shape, size, orientation, texture, neighborhood density, and rapid growth rate). The variation of these properties creates difficulties for consistent and precise detection of mushroom properties via optical image processing algorithms.

A mushroom grows at an accelerated rate in a controlled growing room environment. In order to increase the yield a grower will introduce a growth stagger which achieves multiple waves of mushroom growth within the same square meter of growing space. Selective harvesting is the process of harvesting a specific mushroom at the optimal size to maximize crop yield. Neighboring mushrooms also have an effect on the mushrooms around them so the selective harvesting process can be complex. Selective harvesting also includes the identification and harvesting of a smaller sized mushroom in order to provide room for adjacent, larger mushroom to grow to maximize size.

Depending on the commercial mushroom farm operation manual (human) harvesters are instructed to pass over the mushroom beds multiple times throughout the day to try and achieve the theory of selective harvesting. Manual harvesting is unable to achieve true selective harvesting because of difficulties in accurately measuring the diameter of a mushroom with your eyes, differences in a harvester training retention and a harvester's experience all which results in variation in the harvest results and reduction to crop yield. Further, manual harvesting is typically conducted during a single 8-10 hour shift which can result in mushroom harvested at the end of the shift being picked before they are at an optimal size. If a mushroom is not picked at the end of the shift the growth overnight could cause the mushrooms to exceed the target size and the resulting product becomes waste (e.g., an open mushroom that is too small).

FIG. 1 is a photograph of the front view of a single level or shelf of a typical Dutch-style multilayered grow bed. The photograph clearly shows mushrooms at different stages of development, mushrooms growing in groups (often referred to a "clusters"), mushrooms growing upright, mushrooms grown sideways, and so forth.

Attempts have been made to automate the harvesting (picking) of a mushroom, but so far these have been met with limited to no success. Two major flaws in previous attempts to automate mushroom harvesting are: 1) damage (bruising) to the mushroom by the picking devices, and 2) the requirement to transport the growing medium including mushroom(s) to the picking device.

Mushrooms are a very delicate produce and using vacuums and/or suction cups to detach a mushroom from the substrate will most likely cause damage to that mushroom making it non-saleable. Sometimes the damage on the mushroom is not noticeable initially but while sitting in the cooler (e.g., within 24 hours) bruising will become more evident. The issue with transporting the growing medium to the harvester is that it requires a lot of energy and it disturbs the growing environment of the mushrooms. A mushroom growing room has been specifically designed to create an evaporative environment for the ideal mushroom growing environment through the controlling of air flow, humidity, and temperature. That is, by removing the mushrooms and growing medium from this environment you are adversely affecting the growing of mushrooms.

U.S. Pat. No. 5,058,368 (U.S. '368) and U.S. Pat. No. 5,471,827 (U.S. '827) describe the use of cameras to capture optical images of mushrooms on a bed, from which the 2D coordinates of the mushroom centroid and diameters are extracted using image processing techniques. U.S. '368 and U.S. '827 however lack the ability to infer the depth of the mushroom making it difficult to determine the true 3D centroid and diameter of the mushrooms on the bed.

U.S. Pat. No. 8,033,087 (U.S. '087) attempts to solve the prior restriction of fixed cameras by introducing a 2D movable camera which can capture images of the mushrooms at different locations of the bed and therefore is able to infer the depth of the mushroom centroids, but not precise 3D mushroom geometry from the instability of 2D image processing algorithms due to the dynamic properties mentioned above. Instead, the approach of U.S. '087 also relies on the use of grasping technologies that use additional means of measurements to complete the grasp of the mushroom, which is similar to the approach presented in US 2005/0268587.

U.S. Pat. No. 9,730,394 (U.S. '394) attempts to use complex image processing techniques to capture and extract mushrooms, their centroids, diameters, and neighbor information from the captured images, but U.S. '394 also relies on the use of force controlled grasping technology to account for the uncertainty of measurements generated by the image processing technique.

The use of 2D cameras to capture images of the mushrooms has been previously considered and the difficulty of extracting precise mushroom information is demonstrated by the need of using additional methods of measurements and complex processing algorithms that are sensitive to the dynamic properties of mushrooms and their growing environment. Furthermore, the rapid growth rate of mushrooms generates a small window that is ideal for picking mushrooms at the appropriate size and creates the need for high speed mushroom detection and harvesting that satisfy industrial demands. The quality of the mushroom upon picking depends on the method of grasping and the accuracy of the detected mushroom parameters, where slight inconsistencies in the detection stage may result in mushroom bruising or cutting of the mushroom.

There remains a need for fully automated methods and systems for harvesting a single mushroom and multiple mushrooms from a mushroom bed or stacked mushroom beds, which reduces damage to mushroom caps, maximizes yield through selective harvesting, and are able to support pre-existing growing room infrastructure and conditions.

It is an object of the following to address at least one of the above-noted disadvantages.

SUMMARY

The following provides a system, method, and apparatus for automated mushroom harvesting that addresses the above challenges and can enable an industrial standard of mushroom harvesting while adapting to and leveraging the existing infrastructure to avoid large modification costs.

In one aspect, there is provided an automated harvester, comprising: a frame; a vision system supported by a rail at one end of the frame, the vision system configured to scan a growing bed under the frame; and a picking system moveable within a working area defined by the frame, the picking system comprising a plurality of fingers for gripping mushrooms, the fingers being controlled by the picker to move towards and away from each other, each finger comprising a tip and an inner beam rotatably connected to each other to articulate around a cap of the mushroom during a picking operation.

In another aspect, there is provided a picking system for an automated harvester for mushrooms, the picking system comprising: a gantry coupled to a frame of the automated harvester, the gantry permitting translation of the picking system in a plurality of directions, including vertical translation; a gripper comprising a plurality of servo-driven elements to provide multiple degrees of freedom of motion in addition to the vertical translation; and a plurality of fingers for gripping mushrooms, the fingers being controlled by the gripper to move towards and away from each other, each finger comprising a tip and an inner beam rotatably connected to each other to articulate around a cap of the mushroom during a picking operation.

In yet another aspect, there is provided a vision system for an automated harvester, the vision system comprising: a rail sized to extend across a growing bed and be supported above the growing bed by a frame of the automated harvester; a plurality of 3D scanners spaced along the rail, each 3D scanner comprising: a laser; a slot to permit a laser line to be directed by the laser towards the underlying growing bed; at least one camera to capture data detectable from the laser line emitted from the slot; and a processing unit to process the captured data.

In yet another aspect, there is provided a method of harvesting mushrooms using an automated harvester, comprising: instructing the automated harvester to move along a growing bed to scan mushrooms in the growing bed using a vision system comprising a plurality of 3D scanners spaced along a rail of a frame of the harvester; capturing data from the 3D scanners; generating a 3D point cloud from the captured data; using the 3D point cloud to identify candidate mushrooms and generate a picking sequence; instructing the automated harvester to move along the growing bed and to operate a picking system to target candidate mushrooms in the picking sequence; and for each candidate mushroom, controlling fingers of a gripper to move towards and away from each other, each finger comprising a tip and an inner beam rotatably connected to each other to articulate around a cap of the mushroom during a picking operation.

In yet another aspect, there is provided a computer readable medium comprising computer executable instructions for performing the above method.

BRIEF DESCRIPTION OF THE DRAWINGS

Embodiments will now be described with reference to the appended drawings wherein:

FIG. 10 is a front view of the automated harvester showing a vision system rail.

FIG. 11 is a rear view of the automated harvester showing a battery rail.

FIGS. 19a and 19b are enlarged perspective views of the gripper in isolation.

DETAILED DESCRIPTION

The following provides a system, method(s), and apparatus for automatically harvesting mushrooms from a mushroom bed. The system, in one implementation, may be referred to herein as an "automated harvester", having at least an apparatus/frame/body/structure for supporting and positioning the harvester on a mushroom bed, a vision system for scanning and identifying mushrooms in the mushroom bed, a picking system for harvesting the mushrooms from the bed, and a control system for directing the picking system according to data acquired by the vision system. Various other components, sub-systems, and connected systems may also be integrated into or coupled to the automated harvester as discussed in greater detail below.

The vision system as described herein can be implemented in a "rail" or other module integrated into the apparatus of the automated harvester to position vision components for scanning and acquiring data of the underlying mushroom bed. The mushroom bed is meant to support a substrate in which mushrooms grow and are to be harvested. The automated harvester described herein is configured to move along existing rails of the growing bed, e.g., in a Dutch-style multilayered growing bed to scan and pick periodically and preferably continuously without the need for manual harvesting. The vision system can detect mushrooms, their properties (e.g., position, size, shapes, orientations, growth rates, volumes, mass, stem size, pivot point, maturity, and surrounding space), statistics, and the strategies required for instructing the picking system for autonomous mushroom harvesting.

The rail or module of the vision system can include a precisely machined structure designed to hold one or multiple 3D data acquisition devices or scanners, data routing devices, communication modules, and one or more processing units. Power can be provided by a separate rail or module, herein referred to as a "battery rail".

The automated harvester may traverse mushroom growing beds and may contain mushroom grasping and manipulating technologies (embodied by the picking system), therefore increasing the ability of the overall system to harvest mushrooms of the highest quality and yield within the requirements of industrial production.

Figure 2:
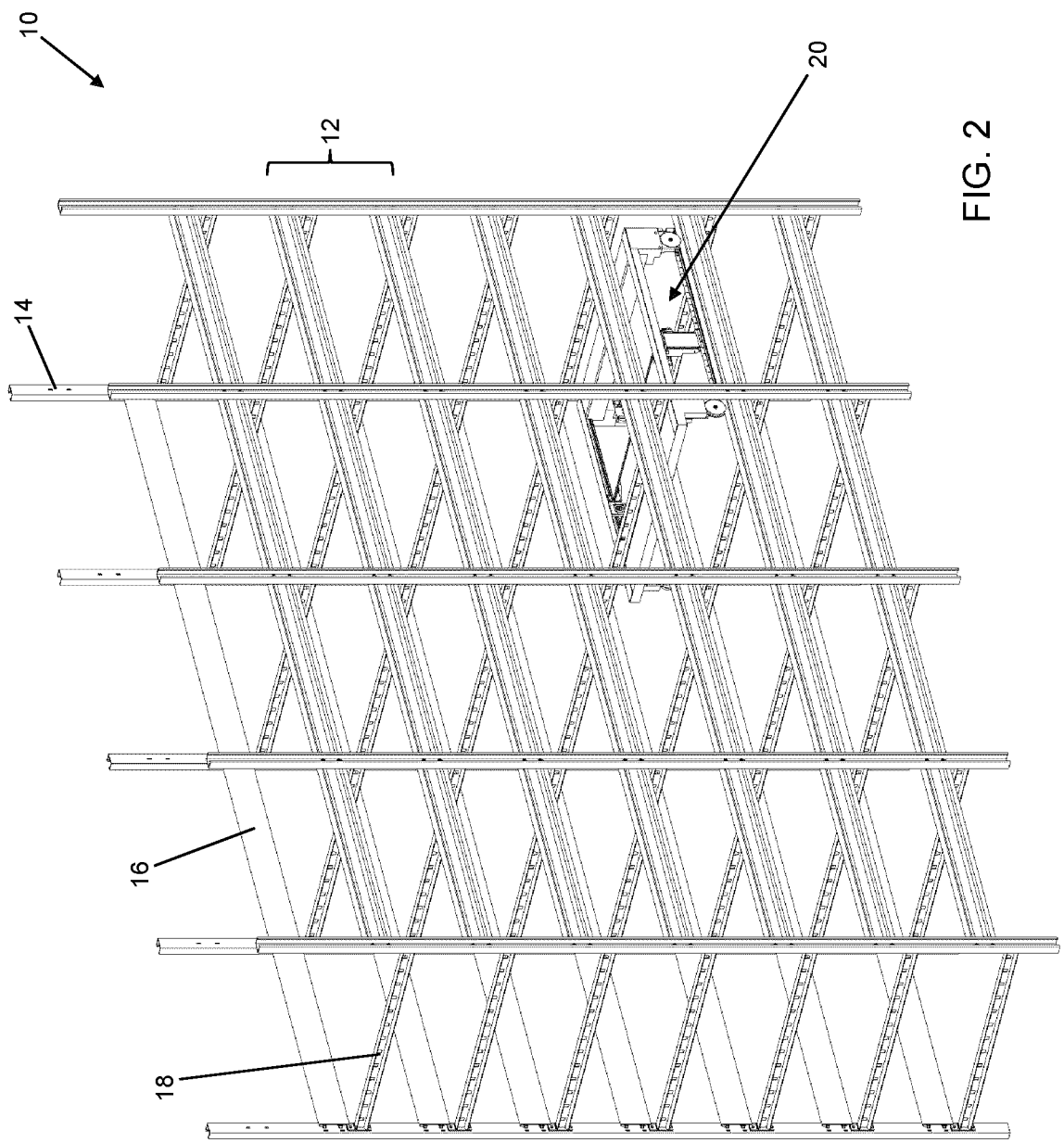
FIG. 2 is a perspective view of a multilayered growing bed with an automated harvester positioned on one of the levels.

Turning now to the figures, FIG. 2 illustrates an example of a standard (e.g., Dutch-style) multilayered growing bed assembly 10 for indoor mushroom growing. It can be appreciated that some components of the growing bed assembly 10 are omitted from FIG. 2 for ease of illustration. The growing bed assembly 10 is constructed to create a plurality of layers or levels 12 (one of which is numbered in FIG. 2). The growing bed assembly 10 includes a number of vertical posts 14 and a pair of side rails 16 at each level 12. The vertical posts 14 and side rails 16 are positioned at a standard distance from each other by a number of cross beams 18. The cross beams 18 tie the vertical posts 14 together to form each level 12 and support the substrate, i.e., growing medium such as compost. Each cross beam 18 includes a number of square-shaped apertures in this example through which square beams (not shown) can be inserted to support the substrate.

Also shown in FIG. 2 is an automated harvester 20 that is positioned on one of the levels 12 to illustrate its adaptability within the constraints of the standard growing bed assembly 10.

Figure 1:
FIG. 1 is a photograph of an end view of a single level of a multilayered growing bed.
Figure 3:
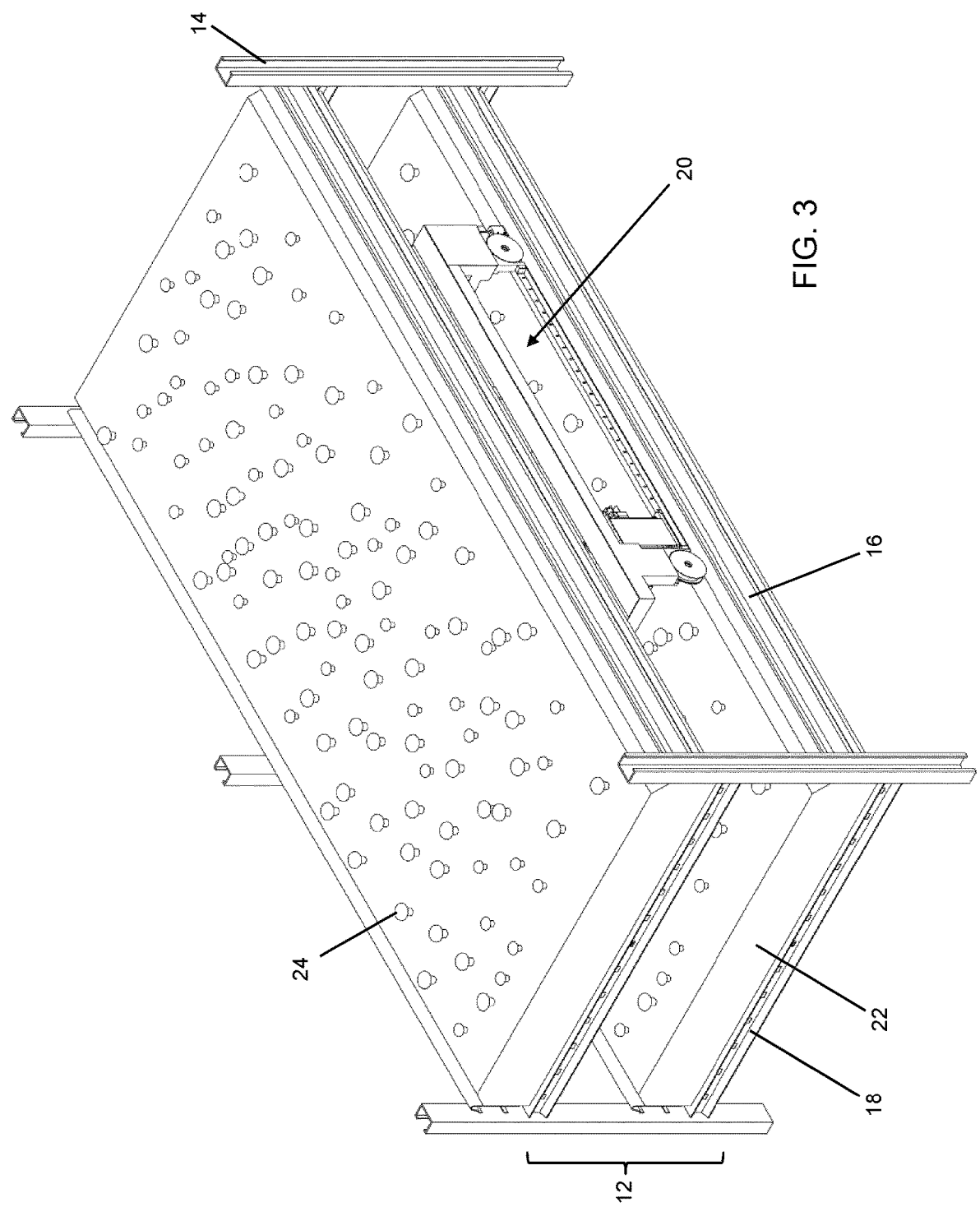
FIG. 3 is an enlarged perspective view of two levels of a multilayered growing bed with a substrate, mushrooms growing in the substrate, and the automated harvester positioned on the lower one of the levels shown.

FIG. 3 illustrates a portion of the growing bed assembly 10 to provide a close view of a first level 12 at which the automated harvester 20 is positioned and a second level 12 above the automated harvester 20. Also shown in FIG. 3 is a substrate 22 (i.e. growing medium) at each level 12 in which a number of mushrooms 24 are growing (see also FIG. 1 for a real-world view). It can be appreciated that in FIG. 3 one of the vertical posts 14 on the near side has been removed to provide a better view of the automated harvester 20. FIG. 3 illustrates more clearly the space constraints imposed by the assembly 10 that are addressed by a number of unique features of the automated harvester 20 that permit adaptability to the existing standard infrastructure without the need to incur significant retrofit costs. The configuration of the automated harvester 20 also eliminates the potentially harmful effects felt by manual pickers which experience the aforementioned environmental conditions and the tight picking area.

Figure 4:
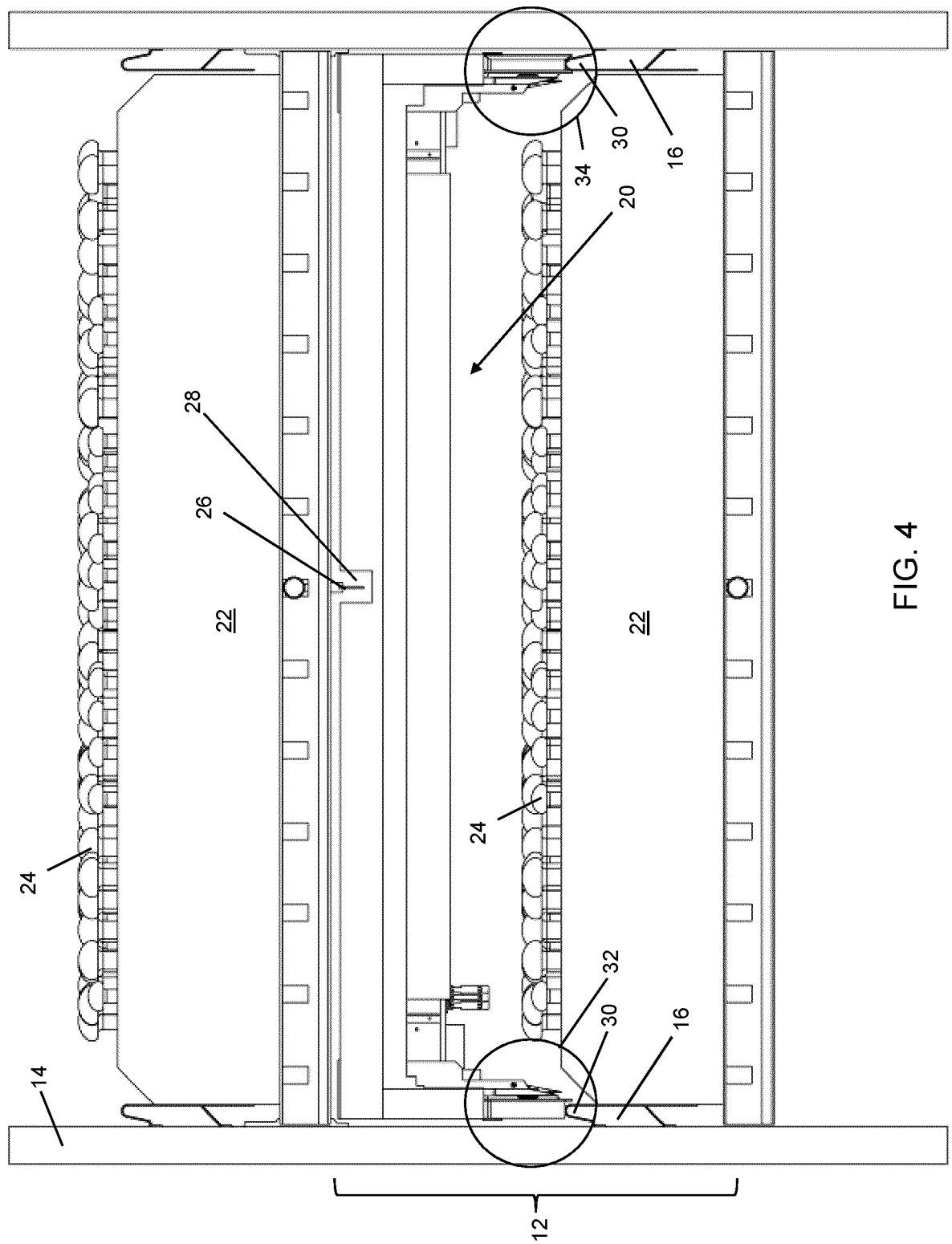
FIG. 4 is a front-end view of the growing bed shown in FIG. 3.
Figure 5:
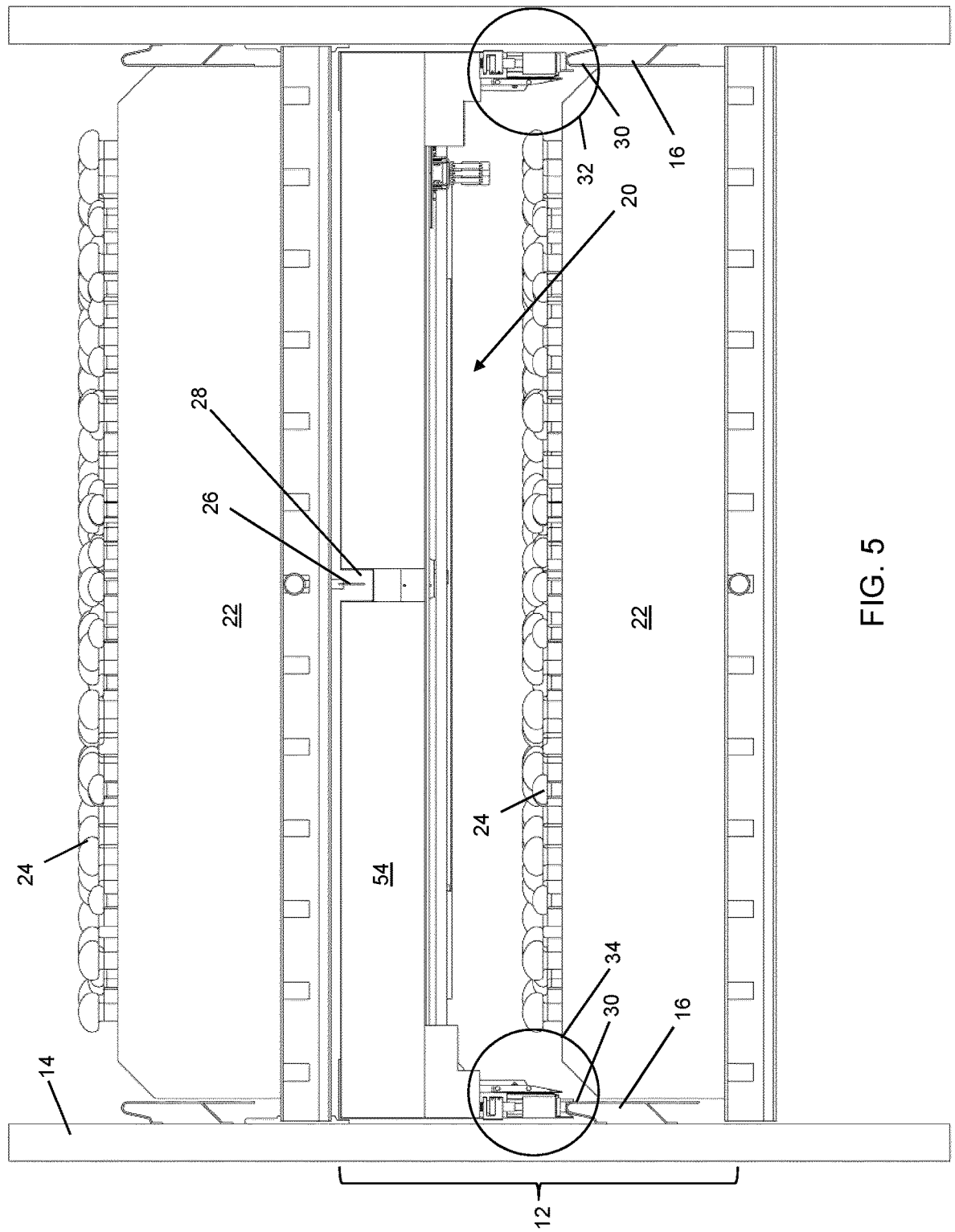
FIG. 5 is a rear-end view of the growing bed shown in FIG. 3.

FIG. 4 provides a front-end view of the automated harvester 20 as seen in FIG. 3, and FIG. 5 provides a rear-end view of the automated harvester 20 as seen in FIG. 3. In the standard assembly 10, a series of irrigation sprinklers 26 extend downwardly from the level 12 above. The automated harvester 20 is configured to include a longitudinal slot or channel 28 through the components of the harvester 20 that would otherwise interfere with the sprinklers 26, providing yet another example of adaptability with the standard assembly 10. When viewing the lower level 12 in FIG. 4, it can be seen that the side rails 16 include an upper track 30 along which wheel assemblies 32, 34 of the automated harvester 20 travel. The substrate 22 in this example is filled to a level that is approximately +/−5 cm relative to the height of the side rails 16. Because of this potential variation, the body of the automated harvester 20 is configured to be positioned as close to the upper level 12 as possible while accommodating the irrigation sprinklers 26.

In FIG. 4, the first wheel assembly 32 on the left side of this view comprises a one-sided flange type wheel that allows the automated harvester 20 to operate on beds that have intolerant widths between the side rails 16, also referring to herein as the "floating side". The second wheel assembly 34 on the right side of this view includes a wheel profile that matches the rail profile (i.e. the profile of the track 30) and includes a two-sided flange. The second wheel assembly 34 may also be referred to herein as the "fixed side". This wheel assembly 34 is configured to stay relatively "fixed" on the track 30 of the corresponding side rail 16 to maintain the position of the automated harvester 20 relative to this rail 16. At the same time, the other (floating) side of the automated harvester 20 can tolerate changes in width.

Referring to FIG. 5, in this rear-end view one can see a battery rail 54 in the foreground (to be identified and described below). This end of the automated harvester 20 is also configured to accommodate the sprinkler heads 26 by providing a continuation of the channel 28. The end views in FIGS. 4 and 5 also emphasize the vertical space between levels 12 and how the automated harvester 20 is sized to just fit in that space. In this example, a suitable tolerance is 1 cm such that any closer and the automated harvester 20 could end up jamming somewhere along the levels 12 by hitting the frame/support bars 14, 16, 18. The beds provided at each level 12 may get damaged over time causing bends or other misalignments, which can interfere with the automated harvester 20 while it traverses a level 12.

From FIG. 5 it can also be seen that the 'shadow" the wheel generates over the bed is kept to a minimum. This is to prevent the automated harvester's wheel support structure from hitting mushrooms 24 that are at the edge of the substrate 22.

Figure 6:
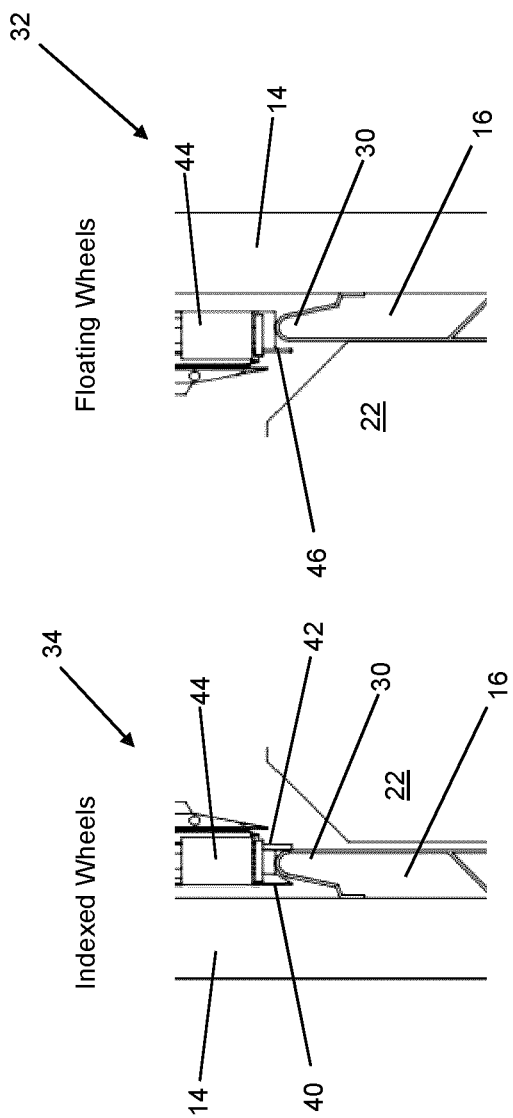
FIG. 6a is an enlarged elevation view of an indexed wheel of the automated harvester.
FIG. 6b is an enlarged elevation view of a floating wheel of the automated harvester.

FIG. 6a provides a close-up view of the indexed type wheel 34, and FIG. 6b provides a close-up view of the floating type wheel 32. As seen in FIG. 6a, the indexed type wheel 34 includes an outer flange 40 and an inner flange 42. On the other hand, as shown in FIG. 6b, the floating type wheel 32 includes only an inner flange 46. FIGS. 6a and 6b also provide a closer view of a brake assembly 44 to enable braking operations to be applied to the tracks 30 over which the automated harvester 20 travels during scanning and picking operations. Further detail of this braking operation is provided below.

The wheels 32, 34 of the automated harvester 20 are located at the four corners of the harvester's frame. The indexed wheel profile matches the profile of the track 30 of the standard bed rail 16, preventing it from sliding left/right. The floating wheel profile having a one-sided flange 46 with a flat wheel profile allow for beds that have damaged or high tolerance bed widths. The diameter of the wheels 32, 34 can be chosen to accommodate space restrictions, i.e., not too big to restrict gantry motion, while being not too small to allow for smooth crossing rail gaps/height differences at the point where two rails 16 connect to form a longer rail 16. As noted above, the width of the wheel 32, 34 and the wheel's support leg are designed to minimize the "shadow" of the wheel/leg over the substrate 22 of the bed. With a large shadow, the structure could damage mushrooms 24 that are close to the bed rail 16. The pulley transmission of the wheels 32, 34 can have a specific gear ratio used to increase the traction/power of the wheels 32, 34 on the rails 16, while both the left and right rear wheels 32, 34 are independently driven to allow for more power but also traction differences between left/right rails 16. The rear wheels 32, 34 also have a physical brake mechanism 44 that engages when the automated harvester 20 is picking at extremely high picking speeds to prevent shaking and position loss due to wheel slippage or sliding. Without this brake mechanism 44, the speeds required for industrial harvesting may not be achievable on these rails 16 without the potential for significant damage.

Figure 7:
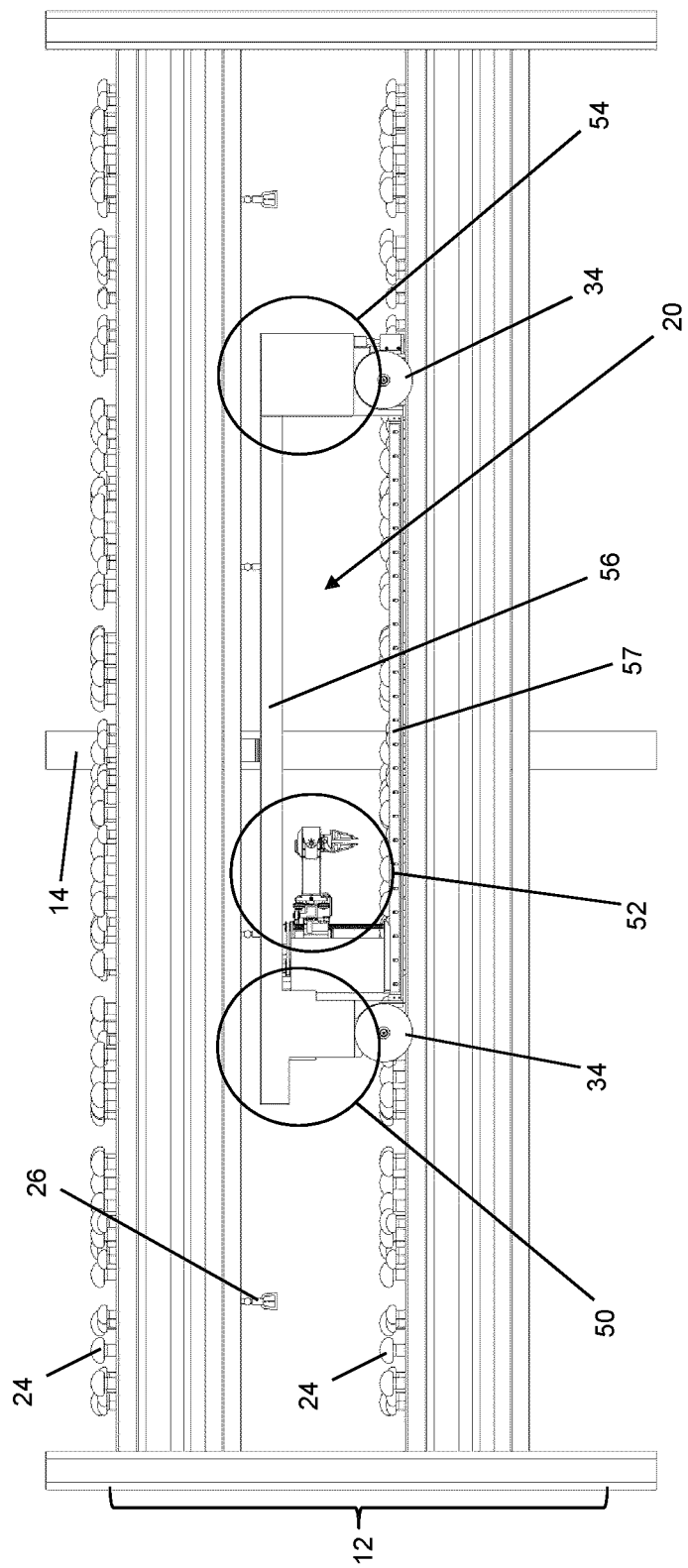
FIG. 7 is a side view of the growing bed shown in FIG. 3.

Turning now to FIG. 7, a side-view of a level 12 of the assembly 10, with an automated harvester 20 positioned therein, is shown. This side-view illustrates the functional components of the automated harvester 20, namely a vision system rail 50 at one end of the harvester's frame, a picking system 52 coupled to and moveable within the extent of the frame, and a battery rail 54. The vision system rail 50 and the battery rail 54 are separated from each other by a pair of upper harvester side rails 56 and a pair of lower harvester side rails 57, which all collectively form the frame of the automated harvester 20. Also seen in FIG. 7 are the front and rear indexed wheels 34. FIG. 7 also illustrates the workspace of the picking system 52, which in one implementation provides an approximately 2000 mm span in the lateral or "Y" direction (i.e., the width)—including the picking workspace and telescoping workspace in that direction (explained in greater detail below). In such an implementation, the picking workspace also comprises approximately 850 mm in the longitudinal or "X" direction (i.e., the length) and approximately 130 mm in the vertical or "Z" direction (i.e., the height).

Figure 8:
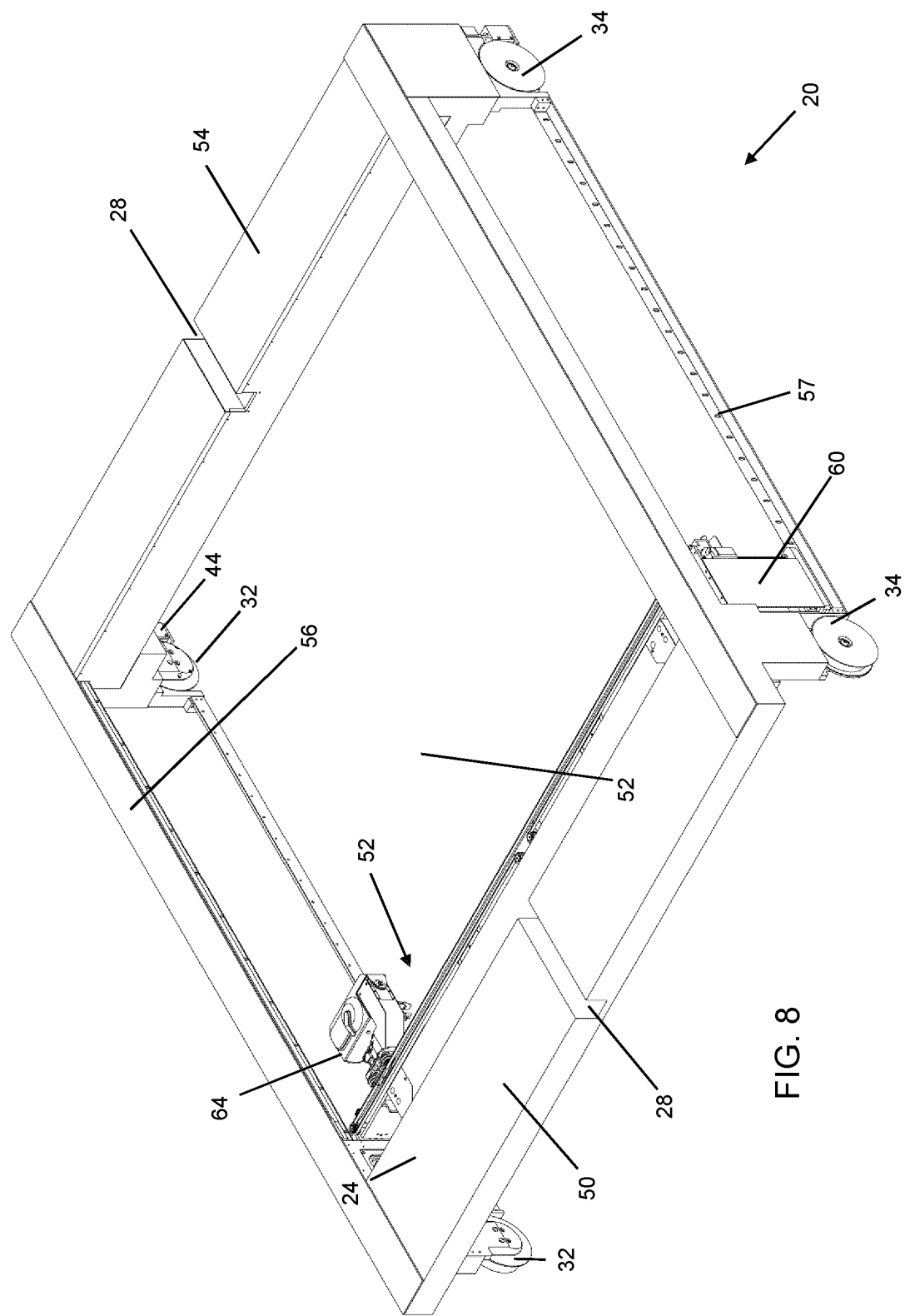
FIG. 8 is a perspective view of the automated harvester in isolation.

FIG. 8 illustrates a perspective view of the automated harvester 20 in isolation to provide additional detail of the configuration described above. The vision system rail 50 at the front of this view incorporates a portion of the channel 28 to accommodate the irrigation sprinklers 26 and extends between opposing rails 16 on a level 12 of the assembly 10. The battery rail 54 at the rear of this view also incorporates a portion of the channel 28 and extends between opposing rails 16 on the level 12. The side rails 56, 57 extend between the vision system rail 50 and the battery rail 54 and create open areas on either side of the frame. As discussed below, this permits the gripper 64 of the picking system 52 to extend beyond the edges of the bed, e.g., to complete a harvesting operation by placing a picked mushroom outside of the bed. The upper side rails 56 also include linear guides along the bottom thereof to facilitate translation of the picking system 52 within and relative to the frame of the automated harvester 20. The wheels 32, 34 and brake mechanisms 44 are also visible in this view. Also shown in FIG. 8 is a gantry 60, which corresponds to the components of the picking system 52 that couple the picker 62 to the frame of the automated harvester 20 and which enable movement or translation of the picking system 52 in the X (longitudinal), Y (lateral), and Z (vertical) axes. Below the axes of the gantry 60 may be referred to as the gantry's X axis, the gantry's Y axis and the gantry's Z axis to denote the components of the gantry 60 that permit movement or translation along the corresponding axis or direction. The gantry 60 can include a motor for moving the gripper 64 in the X direction, a motor for moving the gripper 64 in the Z direction, and a motor for moving the gripper 64 in the Y directions as discussed in greater detail below. Movement in the X direction is aided by the liner guides provided by the upper side rails 56 and the lower side rails 57 as can be appreciated from the view in FIG. 8.

The battery rail 54 contains all power-related mechanisms for the automated harvester 20 and contains a battery pack to enable the automated harvester 20 to be cordless. This avoids cords interfering with the growing bed when the cords are dragged over the mushrooms. The battery rail 54 also may include one or more battery charging ports for autonomous charging via a dock on lift operation. The battery rail 54 also includes network communications antenna to minimize interference from other components of the automated harvester 20 and can be configured to have swappable battery logic to allow for swapping the battery pack while the power is kept on. The battery rail 54 is positioned at the back of the harvester's frame and is positioned at a height to clear any possible mushroom fill level or tall mushrooms (e.g., portabellas) and as noted above to include the channel 28 to clear the sprinkler heads above the harvester's frame.

With respect to the frame, the frame of the automated harvester 20 needs to fit in a very small/narrow space between the growing bed levels 12 while providing sufficient rigidity to support harvesting mushrooms in an industrial setting. The frame should also have the flexibility to deal with high intolerance of the growing bed assemblies 10. In the configuration shown herein, the frame is designed to be tolerant of high compost fill-height and relatively tall mushrooms. To create the rigidity of the core frame precision dowels and alignment blocks can be used for jointing the frame components together. This can assist in preventing frame skewing, misalignments, and position intolerance in the lateral, longitudinal, and vertical directions.

The upper part of the reinforced frame can be used for control/power wiring channels and tracks to allow for unrestricted motion in the lower part of the frame. The upper part of the frame also contains the linear guides (as noted above) that the harvester 20 relies on for position reference and rigidity. The left side of the frame is used as the indexed side of the frame i.e. the mounting points on the left side are precise and have tight tolerances, while the right side of the frame has higher tolerance mounting points to support floating connections. This enables the required high-precision positioning of the picking system 52 even though the growing beds have high tolerances and variability. The frame can use aluminum and stainless-steel components for weight and food-safety considerations. Any plastic components can be chosen to be food-safe grade, while the mechanisms that normally require lubricant can be chosen to have self-lubricating properties. The automated harvester 20 can also utilize covers that cover most of the body allowing the automated harvester 20 to be wiped-down to comply with food-safety regulations.

Figure 9:
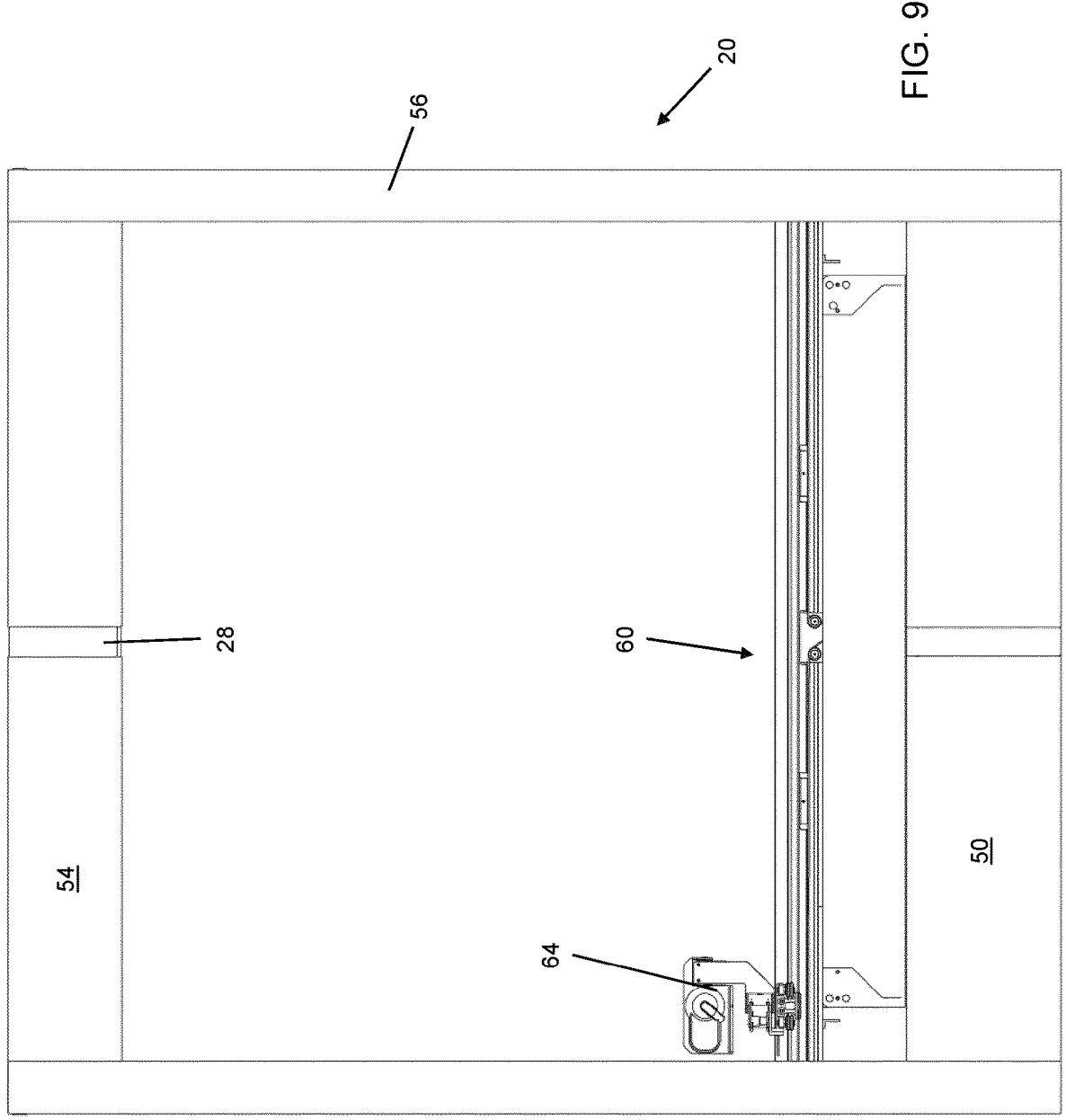
FIG. 9 is a plan view of the automated harvester.

The top view of the automated harvester 20 shown in FIG. 9 provides a plan view of the picking workspace afforded to the automated harvester 20. With the open areas created between the upper and lower rails 56, 57, there can be provided both an internal picking workspace in the lateral or "Y" dimension (width) and an additional telescoping drop off workspace in the lateral or "Y" dimension wherein the gripper 64 can telescope beyond the side rails 16 of the bed. For example, the automated harvester 20 can be configured to provide approximately 1250 mm internally and 2000 mm telescoping, providing 375 mm of reach beyond the rails 16. FIGS. 10 and 11 provide additional elevation views showing the vertical or "Z" portion of the picking workspace, and the lateral or "Y" (internal) picking workspace afforded by the harvester's frame.

The gantry's X axis is connected to the frame via the linear guides discussed above that are precisely positioned and aligned on the top of the frame. The gantry 60 is driven along its X axis via a rack and pinion mechanism to allow for multiple independent X axes i.e. independent picking gantries 60 within the same frame. The gantry 60 slides along its X axis over the linear guide using pillow blocks with internal rollers. The left and right side follow the same indexed for left and floating for right side mechanism as described previously to prevent binding/dynamic friction when bed intolerances that skew the frame are encountered. The gantry's rack and pinion for its X axis can have a spring-loaded mechanism (located on the subassembly for permitting movement in the Z axis—described below) that keep the correct meshing between gears even when the harvester's frame encounters skewing from the rails 16.

The component(s) of the gantry 60 that permit movement along its Z axis (height) is/are coupled relative to the component(s) of the gantry 60 that permit movement along its X axis and is/are custom designed for compactness while providing very high stroke length (e.g., 130 mm) relative to the overall height of the gantry's Z axis. The gantry 60 can be driven in the Z direction via high pitch lead-screw (for speed) with a self-lubricating anti-backlash nut, supported by the linear guide rail that is self-cleaned using a pad. The gantry 60 can be driven in the Z direction by a pulley mechanism with a specifically chosen ratio to prevent the gantry 60 from dropping in case of power loss of the motors. If the gantry 60 drops vertically while on the growing beds, it can damage itself, the gripper 64, and the mushrooms 24 below, or can get stuck in the bed. The pulley mechanism can also have a spring-loaded belt tensioning mechanism to help with dynamic tension adjustments. The left and right side of the gantry's Z axis components can be independently driven for performance and are consistent with the indexed vs floating approach described above. The bottom of the gantry's Z axis subassembly can have spring-loaded wheels which travel along v-groove lower rails 57 mounted on the bottom of the harvester frame to help align the gantry 60 in the Z axis during motion as well as providing a dynamic meshing mechanism for the rack and pinion used to permit movement of the gantry 60 along the X axis. The gantry's Z axis sub-assembly can be enclosed within covers to reduce water/humidity damage and have an active cooling mechanism for the motors.

The component(s) of the gantry 60 that permit movement along its Y axis (width) is/are coupled relative to the component(s) of the gantry 60 that permit movement along its Z axis and serve(s) the purpose of manipulating the position of the gripper 64 in the Y direction along the width of the mushroom bed as well as to telescope outside of the bed, e.g., up to 375 mm to either side of the rails 16. The total stroke of the gantry 60 along its Y axis can therefore be up to two meters. To achieve the telescoping mechanism, the gantry's Y axis can be split into two parallel axes, i.e., Y1 and Y2. The telescoping mechanism allows the automated harvester 20 to deliver mushrooms (i.e. position the gripper 64) outside of the bed while also being able to avoid bed posts when the harvester 20 is moving forward. The gantry's Y axis is configured to have a very narrow vertical profile to be able to traverse the bed above the mushrooms and below the sprinklers 26. The gantry's Y axis can be both belt and leadscrew-driven in order to achieve high precision, yet also very high speed, in order to pick and deliver mushrooms quickly without damaging them.

Figure 12:
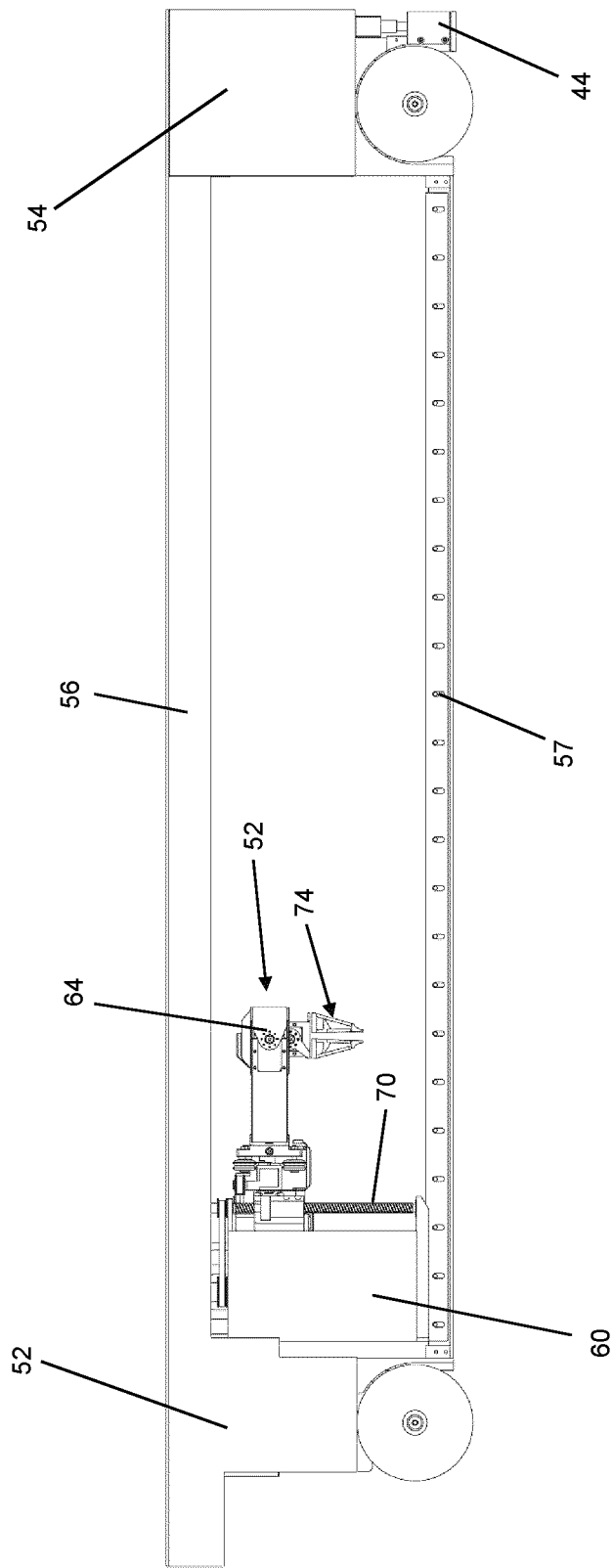
FIG. 12 is a side view of the automated harvester showing a gripper.

FIG. 12 provides a side view of the automated harvester 20 and illustrates the picking workspace in the X and Z directions. From this view, the gantry's Z axis can be seen, as well as its drive mechanism, including a belt driven leadscrew 70 and the linear guide rail. With a lower pitch leadscrew and with a high pully ratio, the gantry 60 should not drop vertically with a power loss. This can be important since if the gantry 60 were to drop vertically with a power loss, it could damage (e.g. crush) the underlying mushrooms 24 or get stuck in the substrate 22. This is in contrast to using a braking mechanism that would be heavy and slow down performance. The gripper 64 is also visible in this view and includes a plurality of fingers 74 depending therefrom. The gripper 64 (and picking system 52) controls not only the positioning of the gripper 64 but also the actuation of the fingers 74 to delicately pick the mushrooms 24. Also shown in FIG. 12 is a brake mechanism 44 located below the battery rail 54.

Figure 13A:
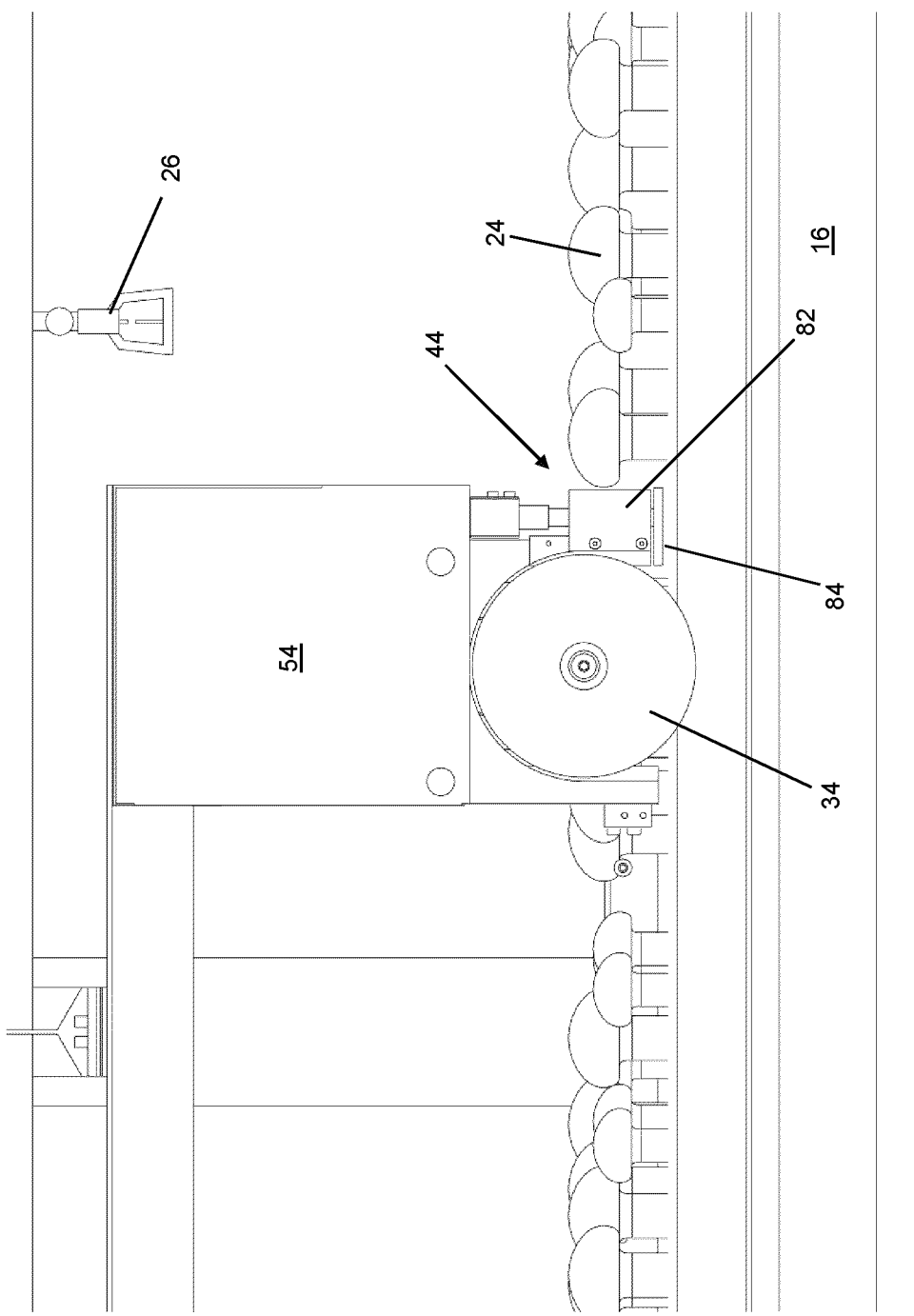
FIG. 13a is an enlarged elevation view showing a brake in a disengaged position.
Figure 13B:
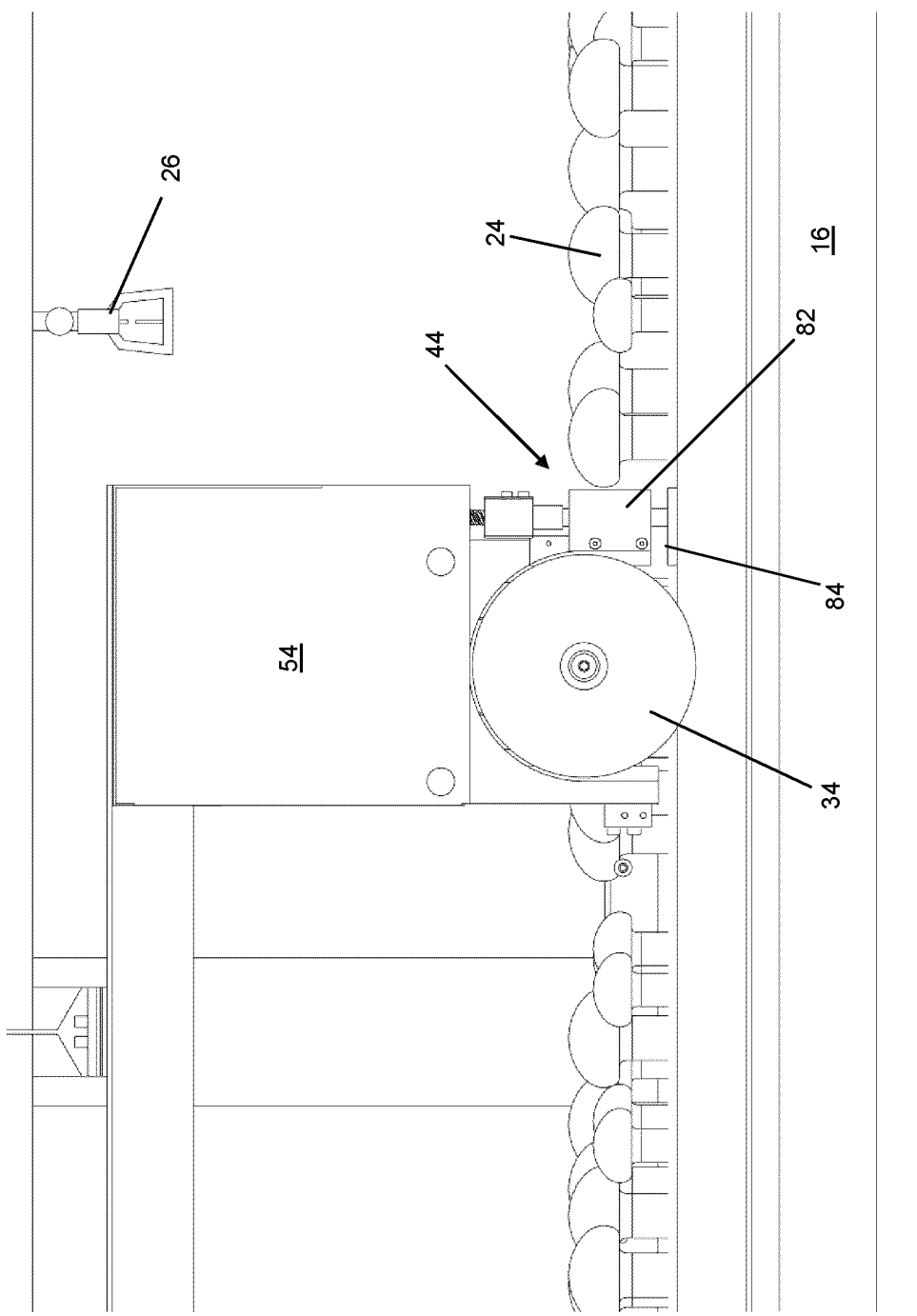
FIG. 13b is an enlarged elevation view showing the brake of FIG. 13a in an engaged position.

FIGS. 13a and 13b provide enlarged views of the braking mechanism 44 in the disengaged and engaged positions respectively. It can be appreciated that in the configuration shown herein, the braking mechanisms 44 are only used on the rear wheels 32, 34 (beneath the battery rail 54) but could be used on all four wheels 32, 34 if desired. The brake mechanism 44 can be driven by a lead screw as best seen in FIG. 13b to drive a brake pad 84 towards the track 30 atop the rail 16 to create a frictional braking action. The brake pad 84 can be driven from a brake body 82.

Figure 14:
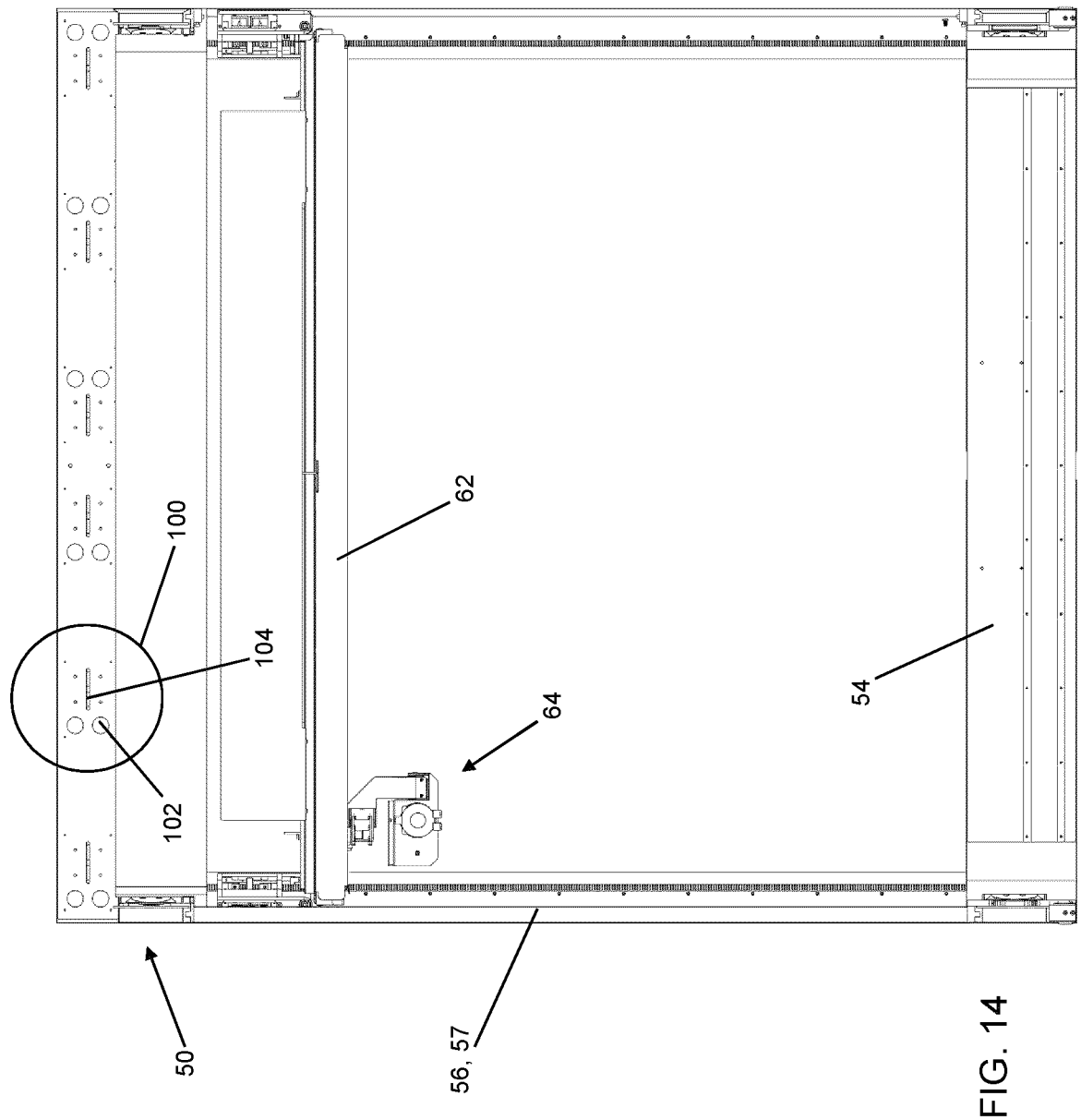
FIG. 14 is an underside view of the automated harvester showing a configuration for the vision system.

FIG. 14 provides a view of the underside of the automated harvester 20 to illustrate components of the vision system rail 50 not seen in previously described views. The vision system is supported by or contained within the vision system rail 50 and for ease of illustration the vision system rail 50 will be referred to below. The vision system rail 50 is located at the front of the harvester's frame since the automated harvester 20 is configured to only need to move forward after scanning mushrooms 24 to align the gripper workspace with the scanned data. It may be noted that if the automated harvester 20 moves forward and backward after scanning, the scan data could become invalid since reversing wheel movement can accumulate position errors through backlash or wheel slippage on the rails 16.

The position of the vision system rail 50 relative to the gripper's workspace is important for successful picking of large bed sections at once. The vertical positioning of the vision system rail 50 is also important since it needs to clear all obstacles in the bed, similar to the battery rail 54 as discussed above. However, the vision system rail 50 also needs to allow for the largest possible height difference between the 3D scanners 100 and the mushroom 24 growing from the substrate 22. The width of the vision system rail 50 is also maximized to allow the scanners 100 to capture not just the growing bed, but also a distance beyond the rails 16 (e.g., 300 mm of the 375 mm outside both the left and right side of the bed) to enable the detection of a drop-off location and for post detection.

The vision system rail 50 can also include rail reinforcements to generate rigidity due to the very narrow profile. In this example configuration, the vision system rail 50 supports a set of six 3D scanners 100, each having a pair of camera apertures 102 (for capturing images below the rail 50) and a laser slot 104 for permitting a laser line 106 (see FIG. 15) to project from the vision system rail 50 onto the mushrooms 24 below.

The camera holes 102 can be sealed with optical-grade clear panels.

Since the vision system rail 50 is enclosed, the electronics within it can be passively cooled using the thick and large aluminum surface of the vision system rail 50 to prevent the use of active cooling (e.g., fans) thus preventing humidity from entering the vision system rail 50 during cooling. The vision system rail 50 can have its multiple 3D scanners 100 aligned in one straight line to effectively form a combined (e.g., 1.9 m long) line scanner within tightly constrained vertical spaces, while achieving sub-millimeter accuracy and very high data throughput. The vision system rail 50 can also generate color information that is overplayed on a 3D point cloud allowing for real-time disease detection, mushroom quality and type identification. The vision system rail 50 can also include external air temperature and humidity sensors for the grow room environment as well as contactless soil temperature sensors.

Figure 15:
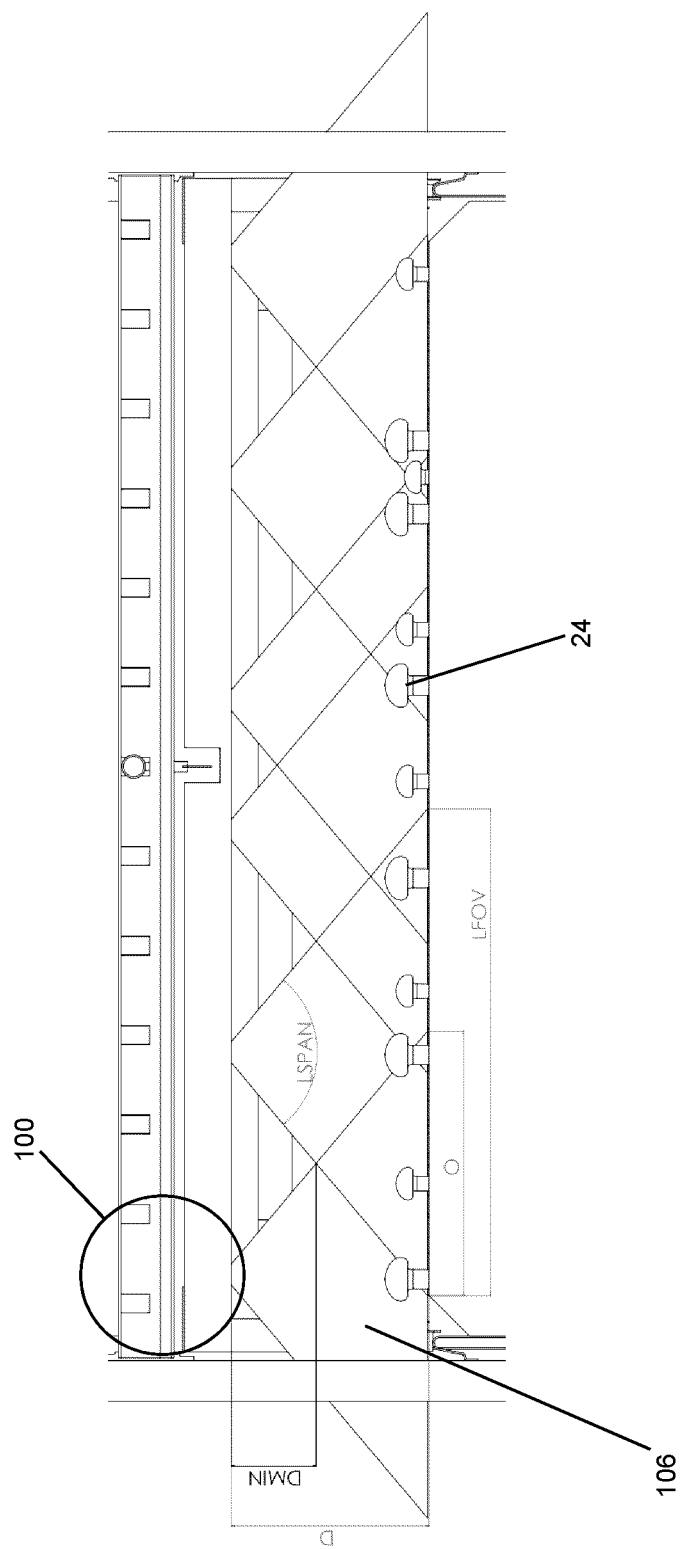
FIG. 15 is a schematic end view of the automated harvester during a scanning operation with underlying mushrooms growing in a substrate.

FIG. 15 illustrates how the multiple 3D scanners 100 can work with each other to scan the entire width of the bed (or more) with only a limited amount of vertical space. In FIG. 15, LSPAN refers to "Laser Scanner Span Angle" and in an example configuration equals 100 degrees. LFOV refers to "Laser Scanner line width" and in this example configuration equals 600 mm. O refers to the laser line "overlap" and in this example configuration equals 325 mm, and D refers to the distance between the scanners 100 and the substrate 22 and in this example configuration equals 240 mm. DMIN refers to a minimum scan distance and in this example configuration equals 100 mm. The variables shown in FIG. 15 illustrate that the configuration can use different values, e.g., other LSPANs, other distances between scanners, etc. The example values given herein can be used to maximize visibility of the mushrooms and their stems.

The different sizes of mushrooms illustrated in FIG. 15 also highlight the importance of using the disclosed configuration.

First, this shows that taller mushrooms 24 can occlude smaller mushrooms 24. That is, in FIG. 15 there is a smaller mushroom 24 (third from the right in the figure) with taller mushrooms 24 to the left and the right. It can be seen that the two neighboring mushrooms 24 would create a shadow on the smaller mushroom 24, however, the laser line 106 above accounts for such a potential problem. Therefore, by using multiple lasers 106, the smaller mushrooms 24 are now visible. Second, this view shows that a mushroom 24 that is at the edge of scanner 100 (or under a large angle) can occlude itself, as such it's important to be able to see all sides of the mushrooms 24 for adequate detection. Third, having the scanner 100 close to the edge of the bed allows the scanner 100 to scan the vertical posts 14 to prevent the gripper 64 from hitting it while telescoping, but also allows the vision system to scan for mushrooms 24 on the very edge of the bed, and for other objects of interest that are outside the bed to be detected (e.g., a mushroom delivery platform).

As a result of this configuration (with the above example values) a 1.9 meter long laser line scanner is created, that has the ability to scan objects even when other objects are occluding it, with a minimum scan distance of 100 mm (for full scanning coverage in this configuration). Therefore, the vision system can fit in very tight spaces that require up close scanning. The rate at which the scanners 100 scan can be between 1-150 lines per second where a line includes 7700 points that cover the 1.9 meters span (including overlapping points). The scanner's resolution in this example can be 0.25 mm in XYZ after processing. The resolution/fps/length of the scanner line can be configured for a vast range of applications that require either precision, or speed, or overlapping region, or length of scanner, etc. That is, one can simply modify the parameters listed above and select sensors having different resolutions.

Figure 16:
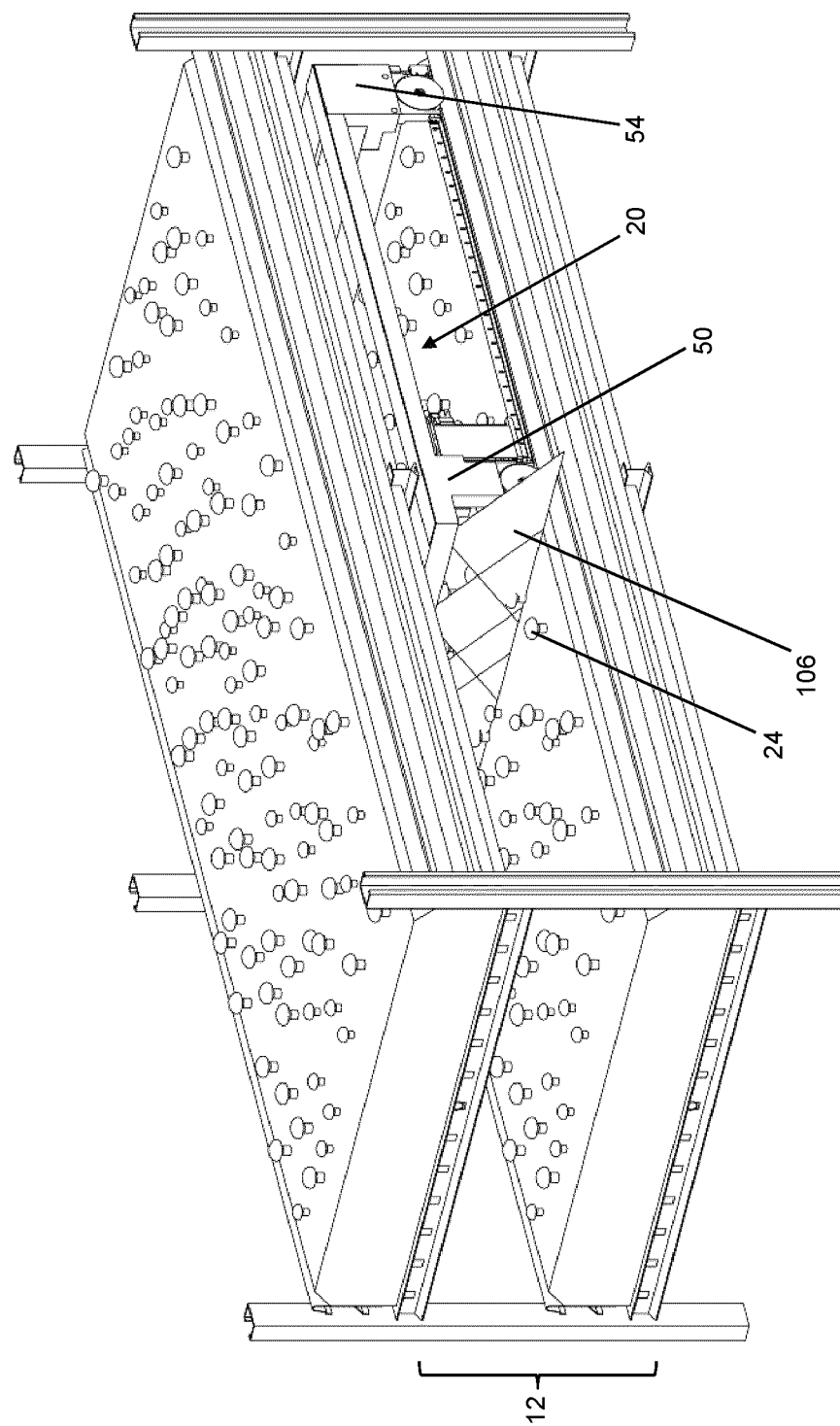
FIGS. 16 to 18 are perspective views of the automated harvester moving along the bed rails during a scanning operation.
Figure 17:
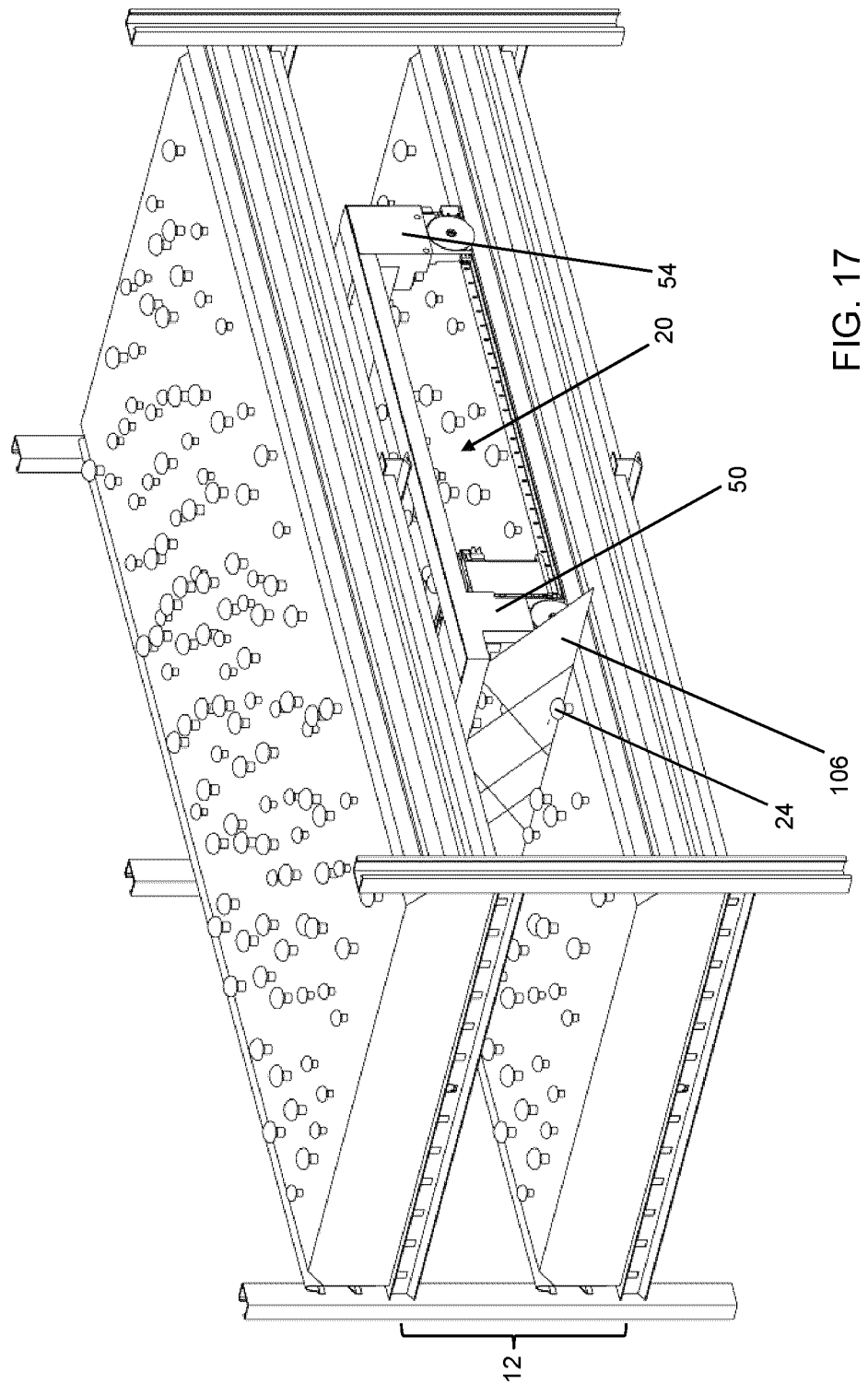
Figure 18:
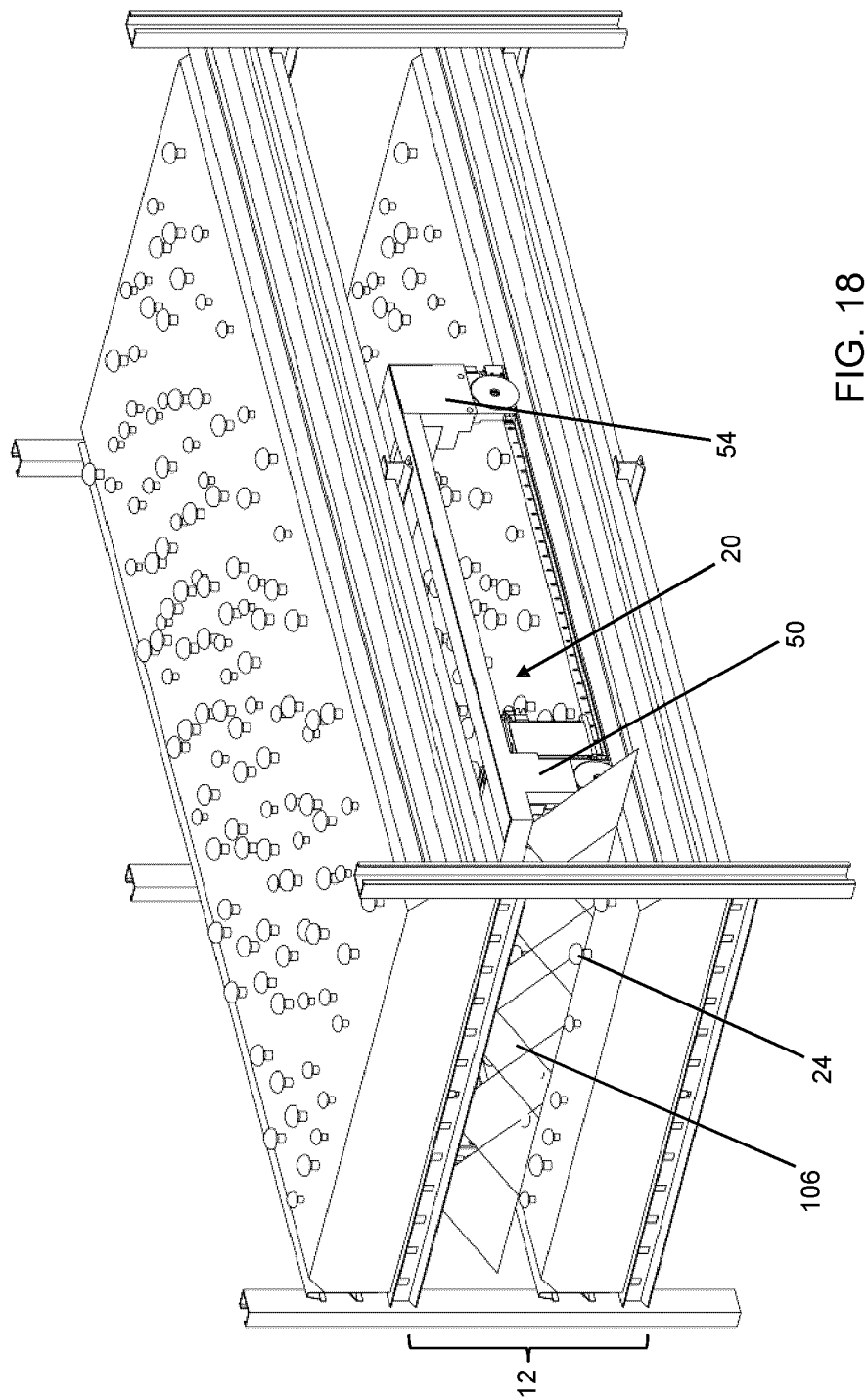

The vision system during a scanning operation is illustrated in FIGS. 16 to 18 that provide a perspective view of the automated harvester 20 moving along the rails 16 of the bed. In these views it can be seen that the combined laser line 106 effectively sweeps over the mushrooms 24 to generate a 3D point cloud for further processing. That is, the physical configuration of the multiple scanners 100 facilitates the scanning of mushrooms 24 within a constrained vertical space.

Figure 19A:
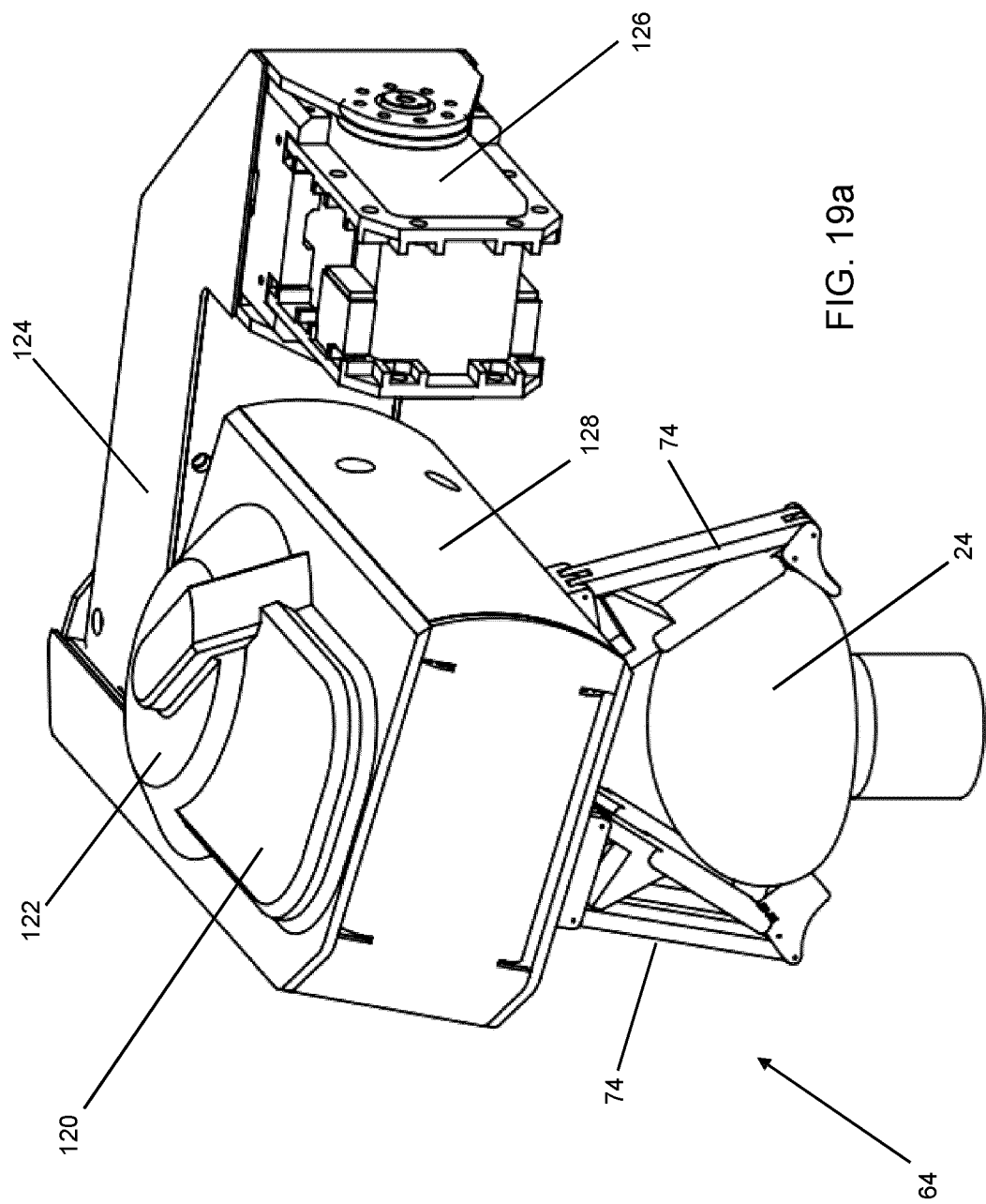
Figure 19C:
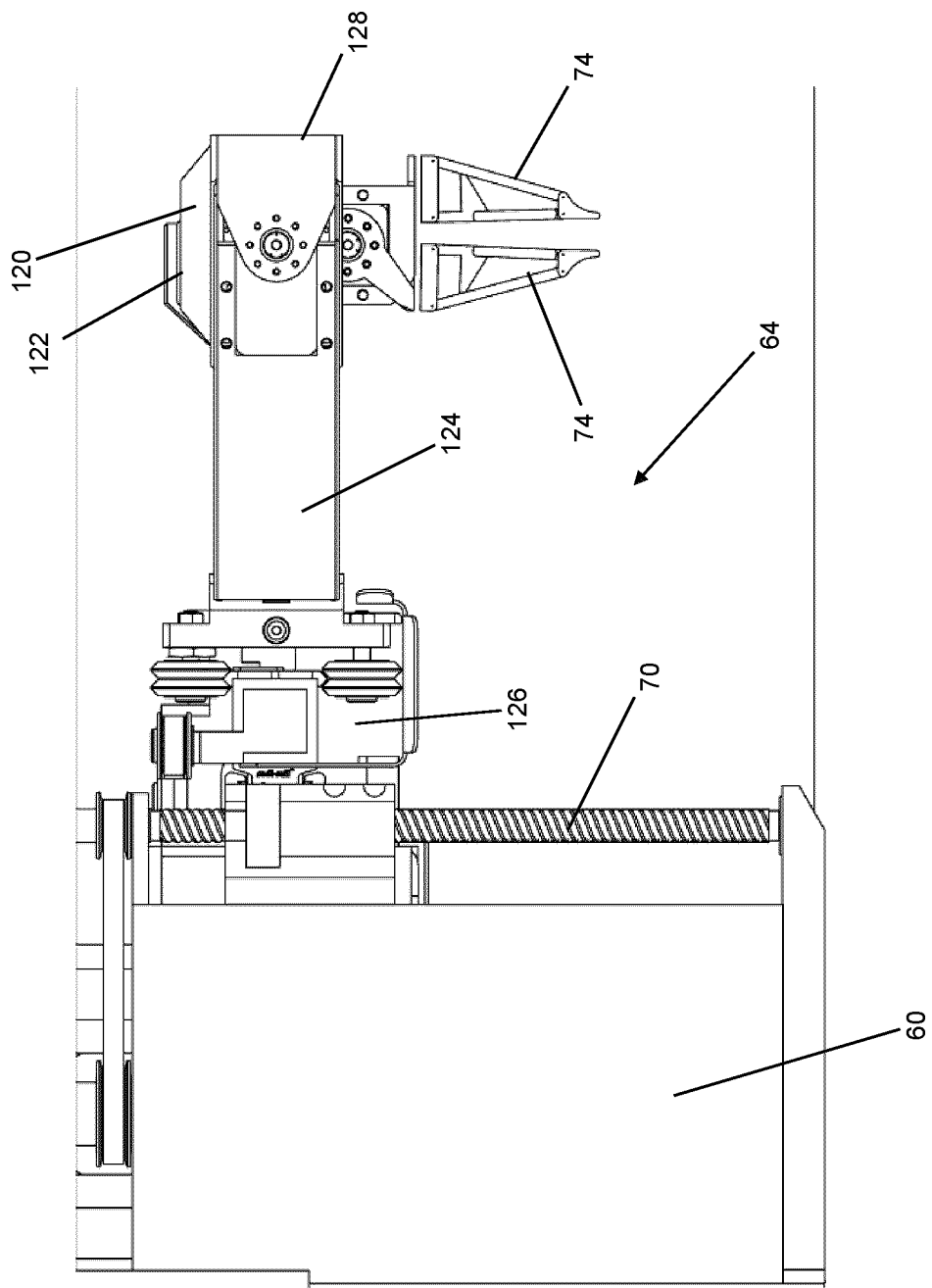
FIG. 19c is an enlarged elevation view of the gripper.

Turning now to FIGS. 19a and 19b, perspective views of the gripper 64 are shown in isolation. A side view of the gripper 64 is also shown in situ in FIG. 19c. The gripper 64 in this example incorporates four degrees of freedom and can perform full hemispherical motion plus is able to open and close a pair of fingers 74. It may be noted that this is the least amount of degrees of freedom required to successfully pick and manipulate mushrooms 24 and was modelled after how humans pick mushrooms 24. In conjunction with movement along the axes of the gantry 60 and the operation of the fingers 74, the gripper 64 can push, pull, twist, tilt, hold, release, and move mushrooms 24 very gently. The gripper 64 is load sensitive and thus can feel pressure as it is being applied to the mushrooms 24 so as to not crush them.

The gripper 64 is connected to the gantry 60 and is controlled to execute advanced manoeuvres to replicate human picking motions. To achieve this, the gripper's four degrees of freedom (i.e., multi-turn spherical manipulator and open/close fingers 74) have a narrow profile in all directions to prevent gripper contact with neighbouring mushrooms 24 during a pick. The gripper motor controls and power wiring can be daisy chained to allow for compactness and simplicity of wiring. The gripper 64 is capable of tilting, twisting, pushing, pulling, and carrying a mushroom using the specially designed fingers 74 that attach to the gripper 64.

The fingers 74 attach to the gripper in a specific configuration (e.g., thumb at 0 degrees, left index finger at −165 degrees, right index finger at +165 degrees). This configuration was chosen as the optimal and minimal required number of contact points while generating a geometrical lock on the mushroom 24 for manipulation in any direction without the reliance on finger friction. The mechanism for attaching the fingers 74 to the gripper 64 can be adjustable to allow for +/−20 degree changes in their position as well as how close the index fingers 74 are to the thumb finger. This allows the gripper 64 to target mushroom sizes that differ by 100 mm using the same fingers 74 and gripper 64.

The fingers 74 can be configured to slide on to the mechanism on to a mounting portion of the gripper 64 from the outside towards the center and can be ratcheted so they can only slide forwards. This helps with easily swapping out fingers 74 for new ones, while remaining stiff when mushrooms 24 apply force in the opposite direction. The gripper 64 has the ability to sense closing force on the mushroom 24 to prevent damaging the mushroom 24 during picking effectively mimicking "human force sensing" when picking mushrooms 24.

Figures 20A, 20B, 20C:
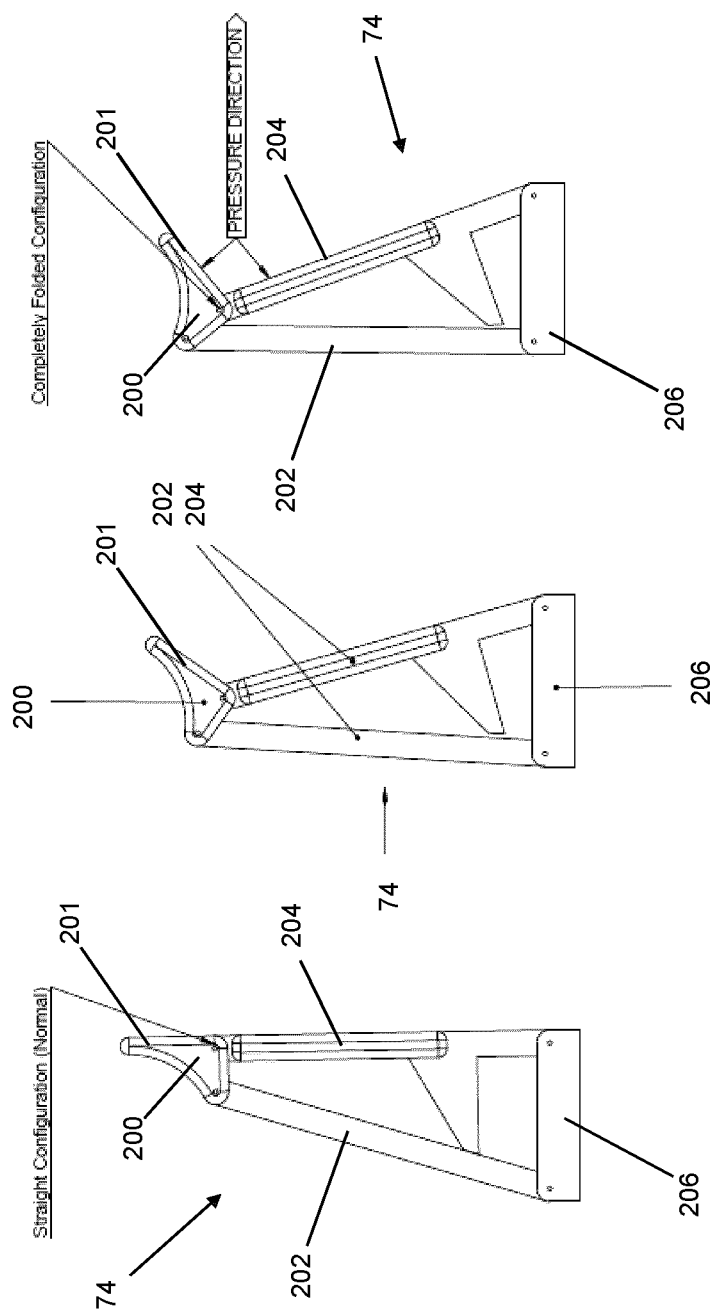
FIGS. 20a to 20c are elevation views of a gripper finger in different configurations.

Turning now to FIGS. 20a-20c (discussed further below), the finger 74 may be unibody or made of subcomponents connected to each other (as shown). It can be appreciated that in a unibody construction the possibility of finger parts falling on the mushroom bed i.e. metal hinges or subcomponents of a multi-piece finger 74 could be avoided. A one-piece construction can have the back of the finger 74 be ridged (thicker), the front be flexible (thinner), and the hinges between thinned out so as to allow for bending radius control and overall desired stiffness of the finger control when in contact with a mushroom 24. Again, the overall design of the finger 74 (whether unibody or multi-component) is configured to replicate a human's ability to bend the tips of their fingers under a mushroom cap. If any damage were to occur, it would thus occur under the cap, which is typically deemed acceptable by industry standards.

The body and tip of the finger 74 are narrow to be able to fit between the tight spaces between mushrooms 24 without contacting neighbouring mushrooms 24. The fingers 74 can be covered with food-grade finger cots (i.e., a type of glove) that can be used to extend the life of the finger 74 and provide cleanliness, food-safety, and create a soft barrier between the mushroom's surface and the relatively rougher finger surface.

If the finger 74 is to touch a neighbouring mushroom 24 during finger insertion, the gloved surface would contact the mushroom 24, while the finger 74 would slide along the internal surface of the glove, thus not damaging the mushroom's delicate surface. The finger 74 and its gloves are also intended to be replaced often, which can be done to match a human's glove replacement levels to satisfy established food-safety regulations in the industry.

The fingers 74 can also be coated to reduce the possibility of disease build-up, as well as irradiated using UVC LED light array as a germicide while in operation to prevent the spreading of disease from one mushroom 24 to another.

As seen in FIG. 19a, the gripper 64 can include a grasping servo 122, and three primary servos 120, 124, 126 and a body 128. Joint rotation axes of the gripper 64 are arranged orthogonally to each other and intersect in a single point. The grasping servo 122 is responsible for actuating the fingers 74 and for sensing grasping force feedback. The primary servos 120, 124, 126 can be used for independent actuation of joints to achieve the various orientation angles described above, for movements such as tilting, twisting, etc. FIG. 19a illustrates the fingers 74 holding a mushroom 24. FIG. 19b provides an enlarged view of what is shown in FIG. 7 and provides an enhanced view of the Z-axis of the gantry 60 and the leadscrew 70.

The construction and operation of a finger 74 is shown in FIGS. 20a-20c. Each finger 74 includes a platform 206, a tip 200, an outer beam 202, and an inner beam 204. The tip 200 is shaped to allow insertion into tight spaces between mushrooms 24 and to minimize damage to surrounding mushrooms 24 during this process. When the gripper 64 closes at least two fingers 74 towards each other, pressure is applied and the fingers 74 fold, as shown in FIGS. 20b and 20c, to geometrically secure a mushroom 24, which allows maximum manipulation forces and minimum impact of friction, which reduces damage to the target mushroom 24. When pressure is removed, the fingers 74 return to a rest configuration as shown in FIG. 20a.

In an implementation, the fingers 74 can be structured to limit motion of the joints in order to work as a lever for a steel spring that unfolds the finger 74. In another implementation, these functions have been redistributed to other elements of the construction so that the previously described structure with the steel spring is not required. FIGS. 20a-20c demonstrate how the fingers can fold when pressure is applied by a mushroom 24 against the inner beam 204 and the flat portion 201 of the tip 200.

Figure 21:
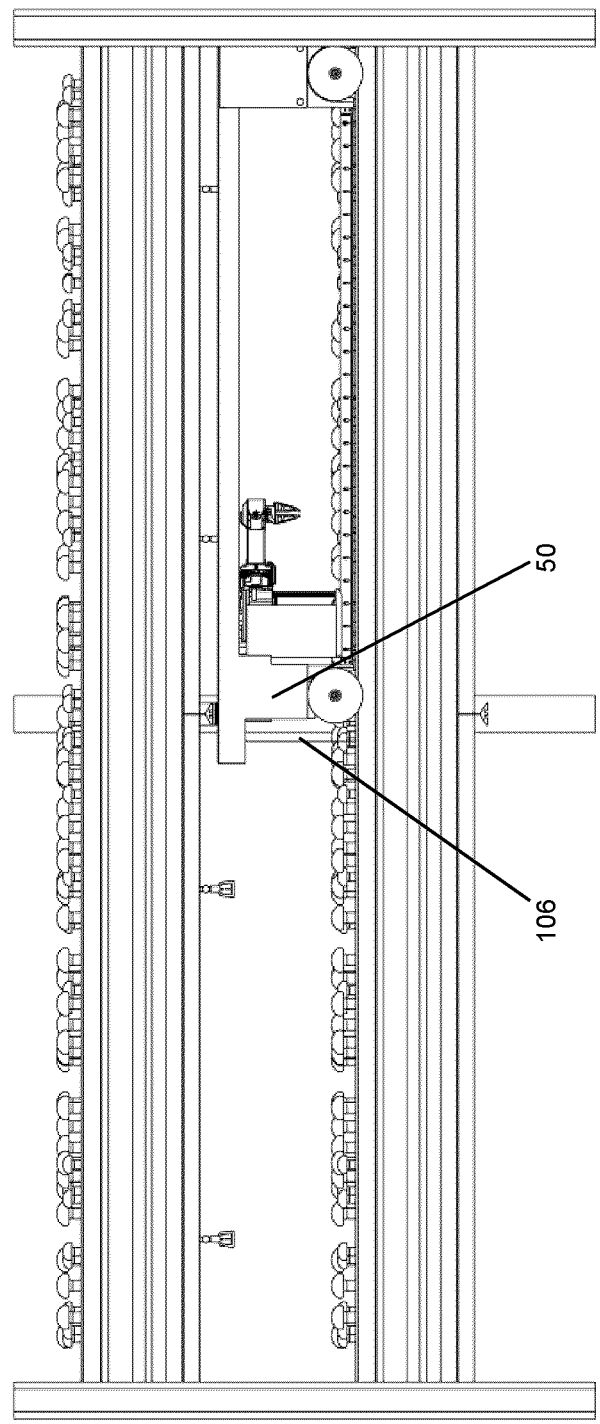
FIGS. 21 to 29 are elevation views of the automated harvester during a picking operation.
Figure 22:
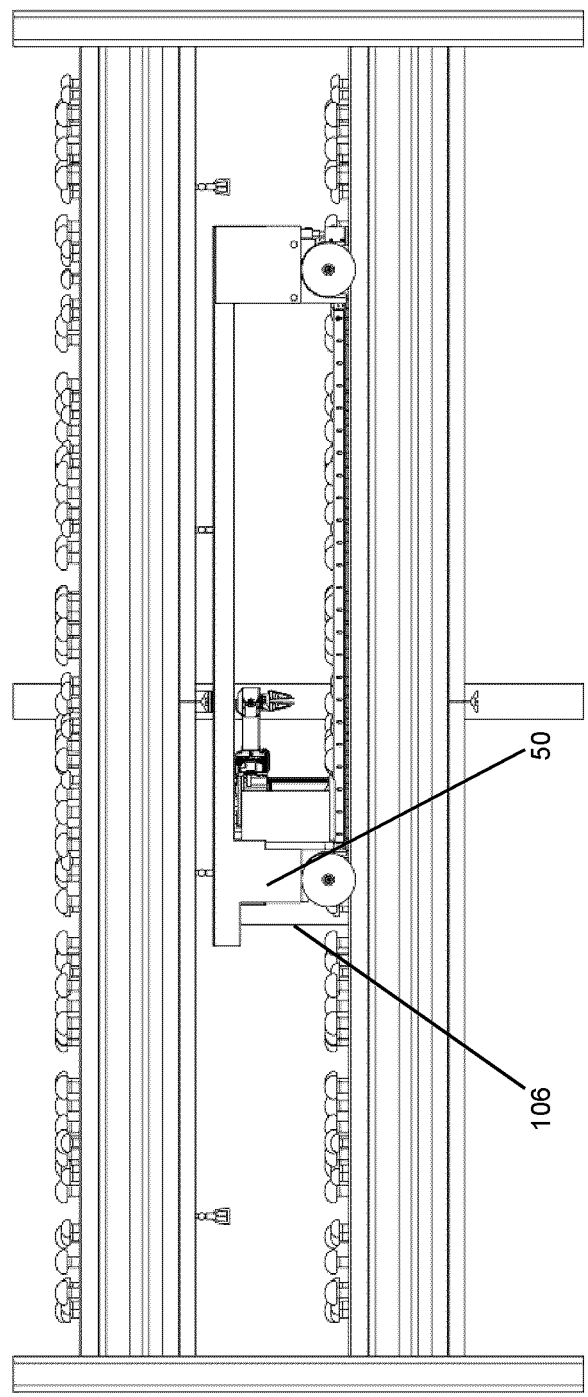
Figure 23:
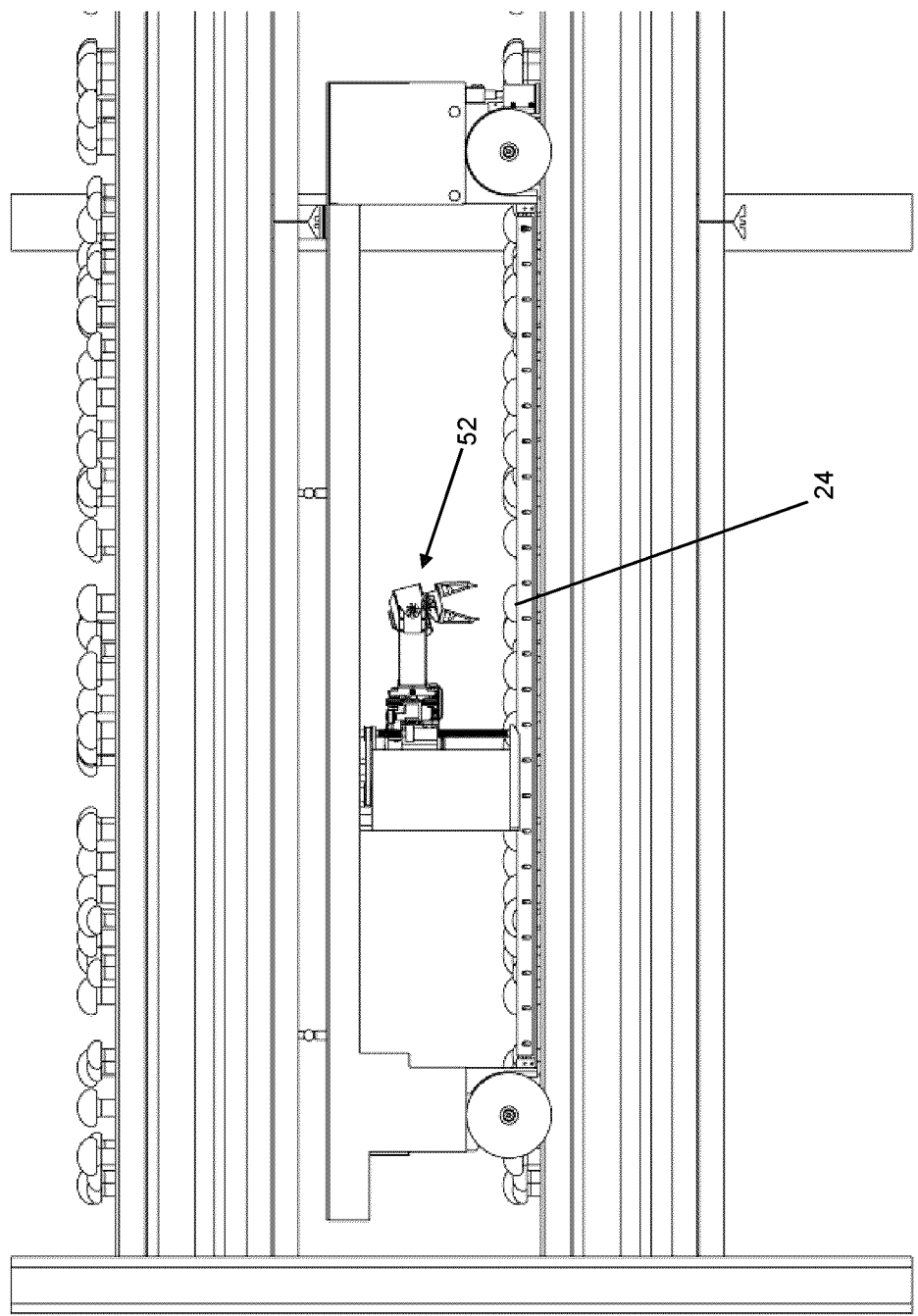

FIG. 21 illustrates a laser scan line 106 from a side view. What can be appreciated from FIG. 21 is that the vision system can scan a section of the bed (e.g., variable length of section up to 800 mm), then move forward into a picking position, and pick mushrooms 24 until no more target mushrooms 24 are available. The automated harvester 20 can repeat this process for the rest of the bed. The harvester 20 does not need to sequentially work its way from start to end, it can first perform a global scan, then dynamically build a picking schedule based on where the target mushrooms 24 are along the bed, and then execute in that order to maximize effectiveness and to reduce chances of mushrooms 24 growing larger than target size. Any suitable logic can be developed and executed to choose a suitable picking schedule. FIG. 21 illustrates the beginning of a scanning operation, FIG. 22 illustrates approximately the middle of the scanning operation, and FIG. 23 illustrates the end of the scanning operation with the gripper 64 beginning to position itself to pick a target mushroom 24 in the section that has just been scanned.

Figure 24:
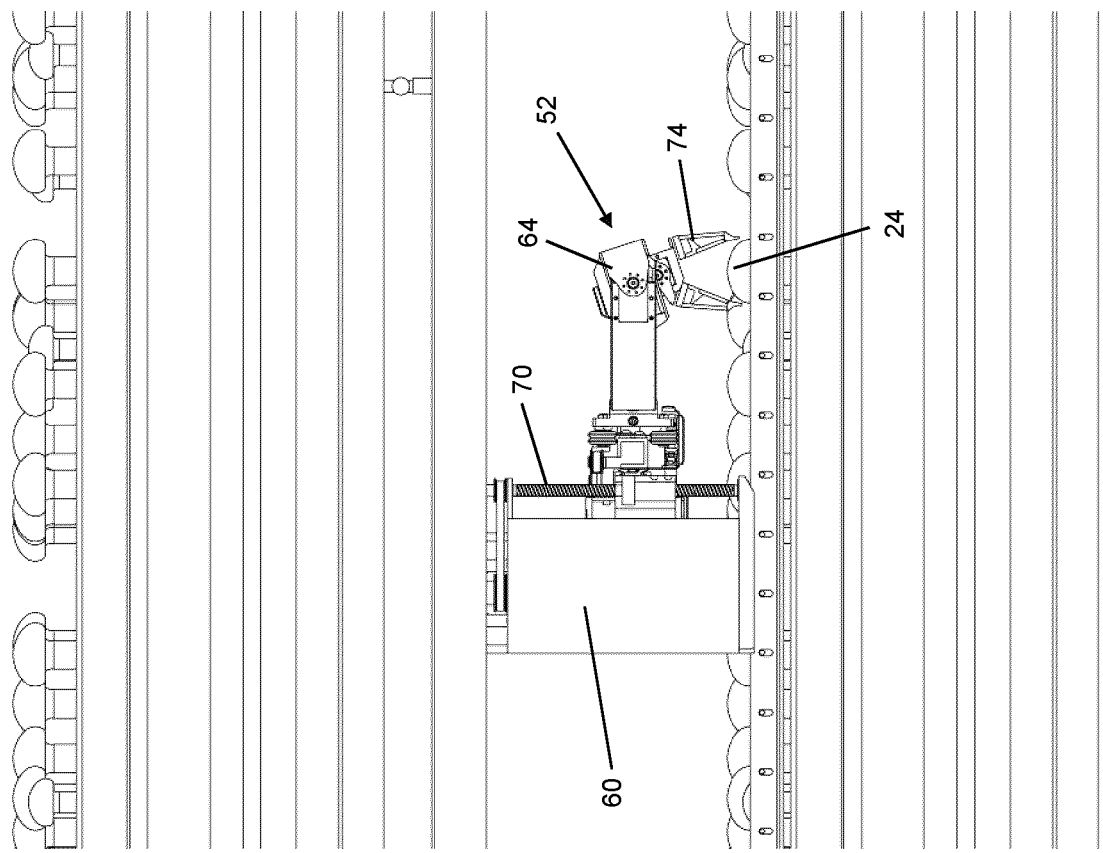
Figure 25:
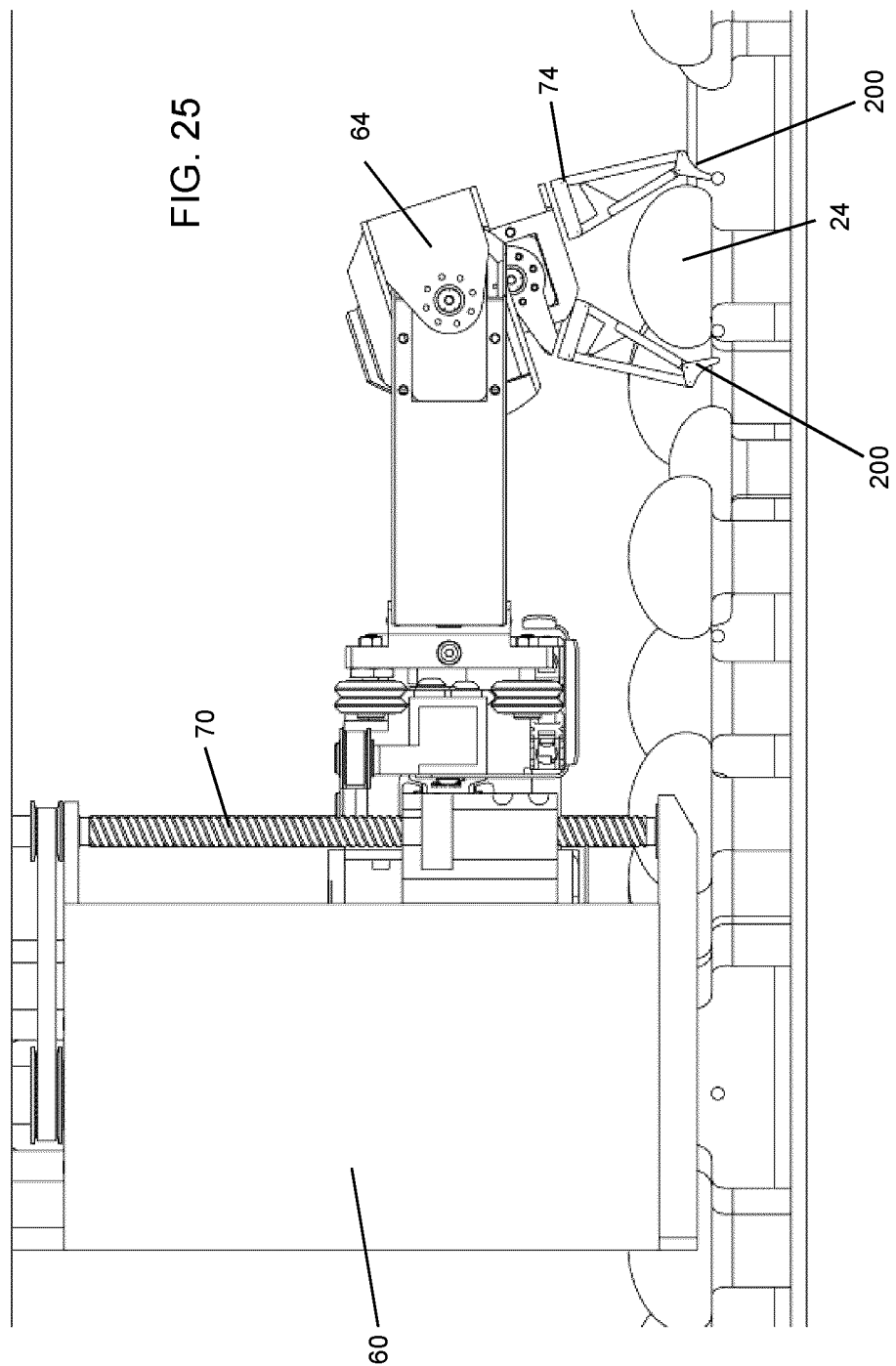
Figure 26:
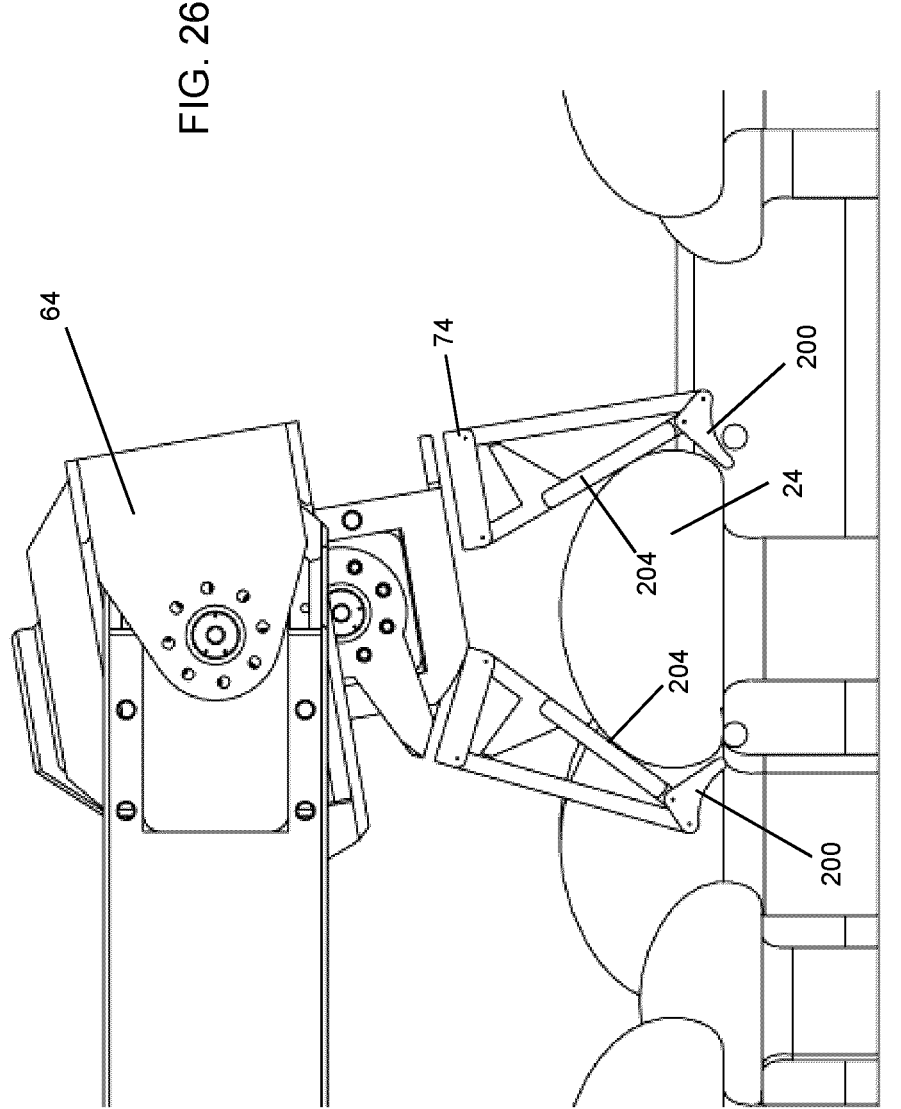
Figure 27:
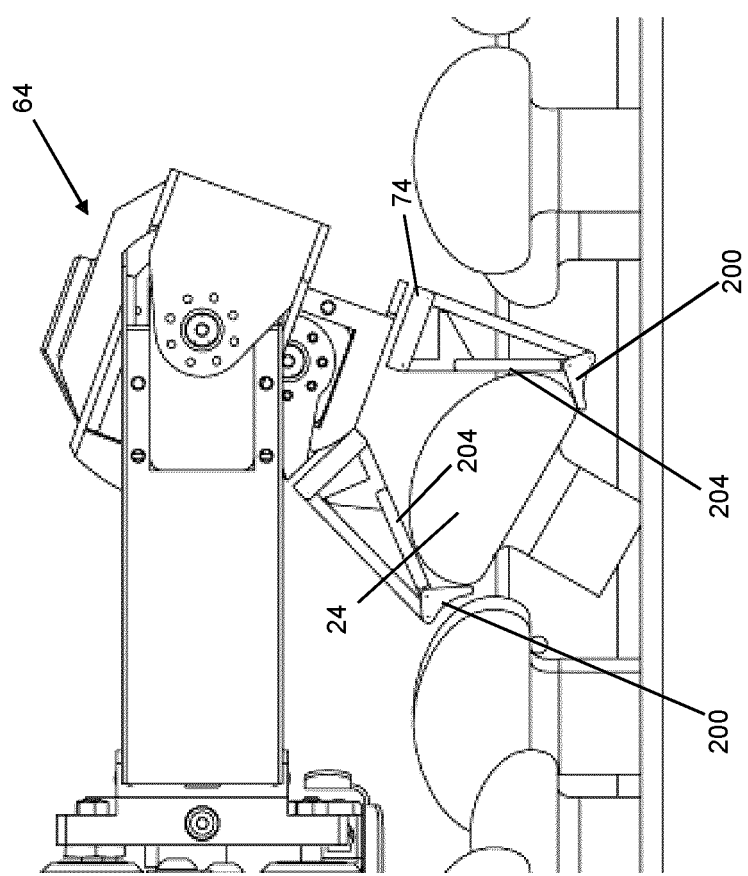
Figure 28:
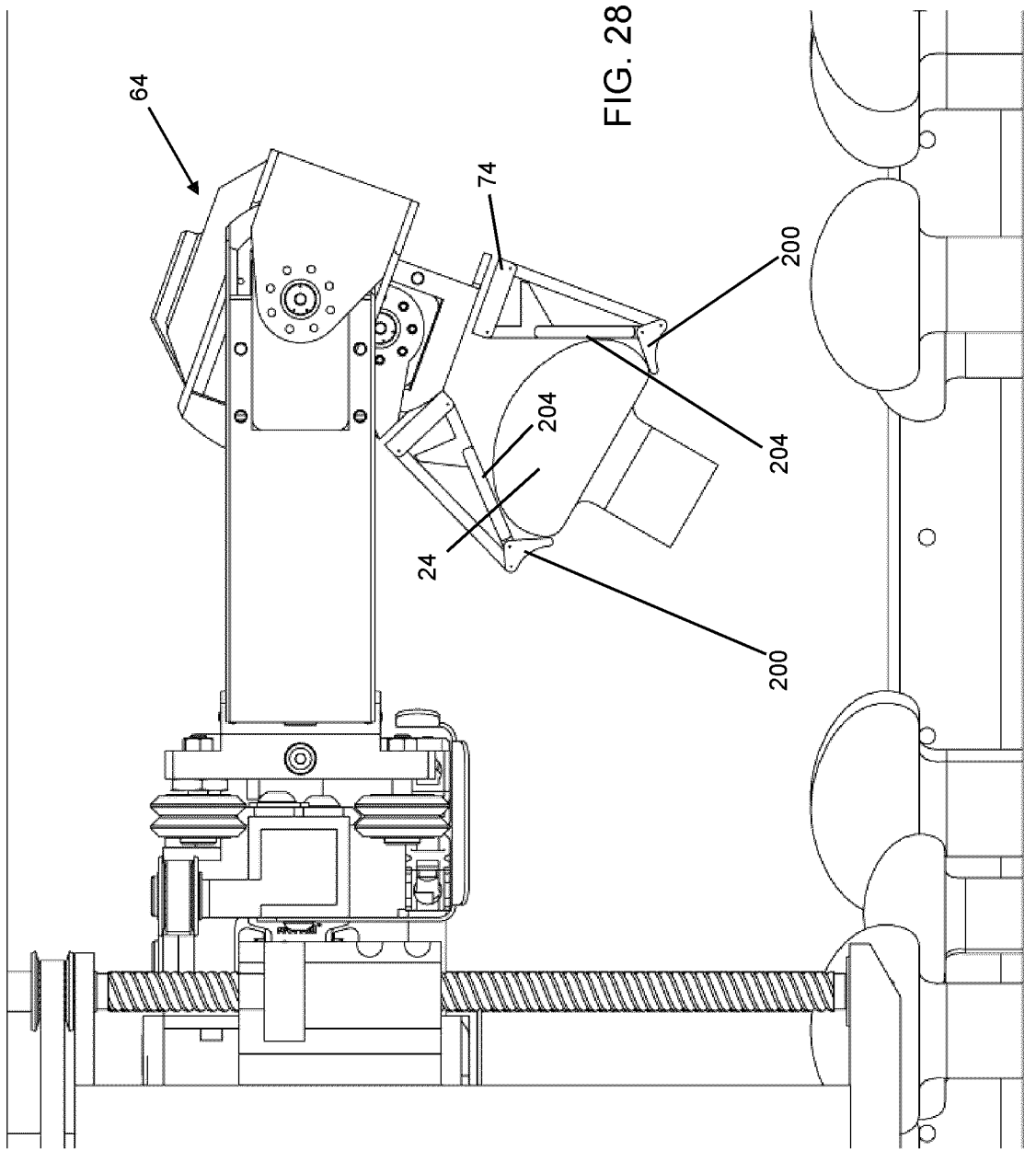
Figure 29:
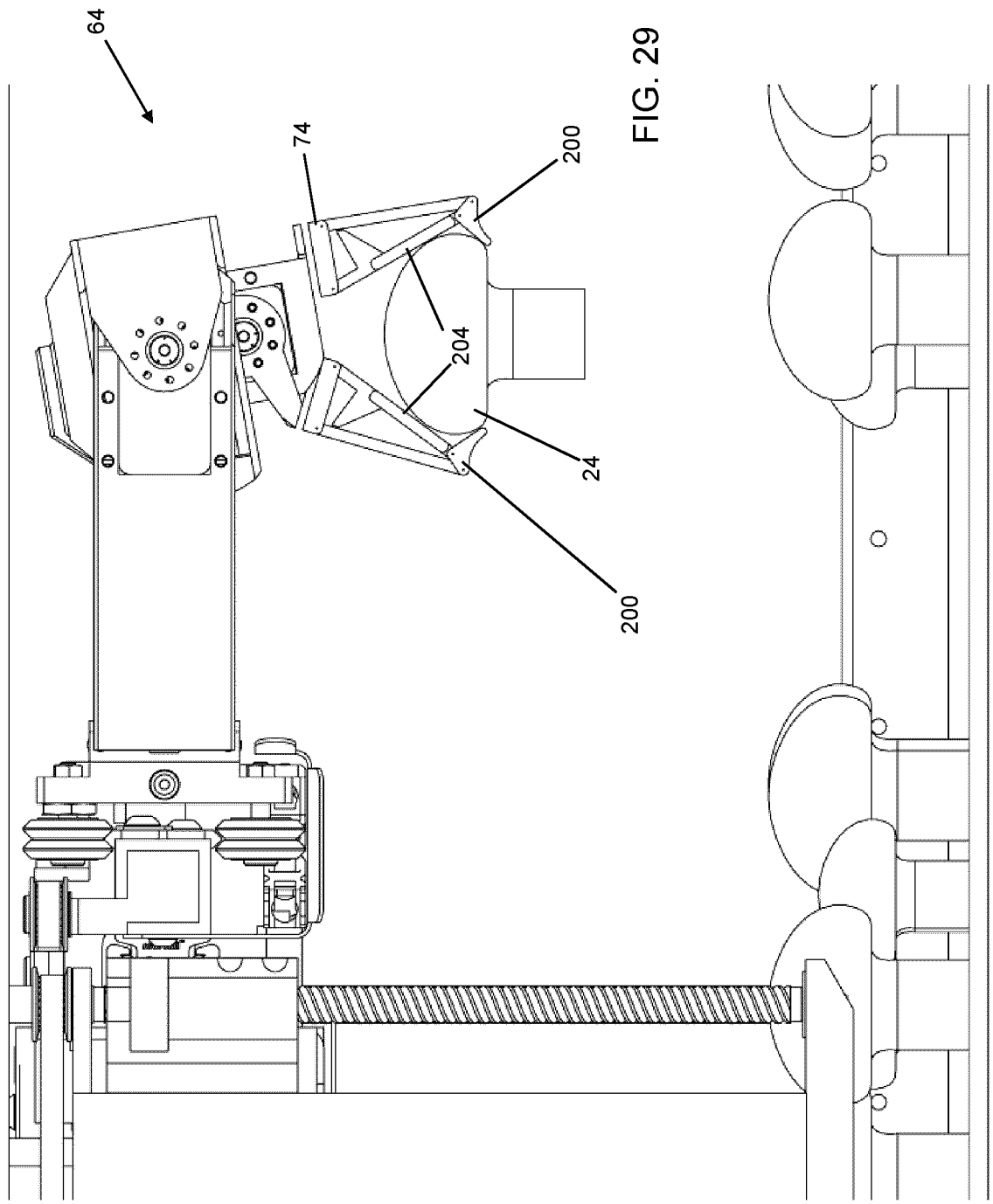

FIGS. 24 through 29 illustrate a picking operation applied to a target mushroom 24. In FIG. 24 the view is zooming in on the picking approach wherein the fingers 74 are inserted around the mushroom 24 so as to carefully avoid contact with neighboring mushrooms 24. It can be appreciated that the automated harvester 20 can be programmed to allow for slight contact, which can be an adjustable parameter. In FIG. 25, the view further zooms to illustrate a close up of the fingers 74 as they begin to form contact with the cap of the mushroom 24. It can be appreciated that the gripper's servos can begin closing (actuating) the fingers 74 over the mushroom 24. When contact is formed in conjunction with finger actuation, the fingers 74 begin conforming around the mushroom 24. That is, if there was no mushroom surface to interact with, the finger's tips 202 would remain straight. In FIG. 26 the fingers 74 come into contact with the mushroom 24. Now, it can be seen that the fingers 74 are in the correct position to manipulate and thus "pick" the mushroom 24 from the substrate 22. It can be appreciated that the intention here is to have the tip 200 of the fingers 74 be located on the underside of the cap of the mushroom 24, which is an acceptable area to create slight damage (while the intention is to ideally have zero damage). As such, if any damage was to occur (unintentionally), it would occur on the bottom of the cap. With the tips 200 under the mushroom 24, the plurality of fingers 74 (e.g., the three fingers 74 shown in FIG. 19*b*) create a geometrical lock with the mushroom 24 preventing it from slipping out while being manipulated. FIG. 27 illustrates a tilt/twist/push/pull action (or a different combination of those actions) that is being applied to the mushroom 24 towards as mush empty space as is available, so as to separate the mushroom stem from the substrate 22 without damaging neighboring mushrooms 24 or hitting other obstacles. FIG. 28 illustrates a picked mushroom 24 being lifted away from the bed, and FIG. 29 illustrates a safe transport position for the mushroom 24 that is out of the way of the other unpicked mushrooms 24. For example, some taller mushrooms may end up with a horizontal transport position to reduce the likelihood of hitting anything while travelling to a drop-off location.

Figure 30:
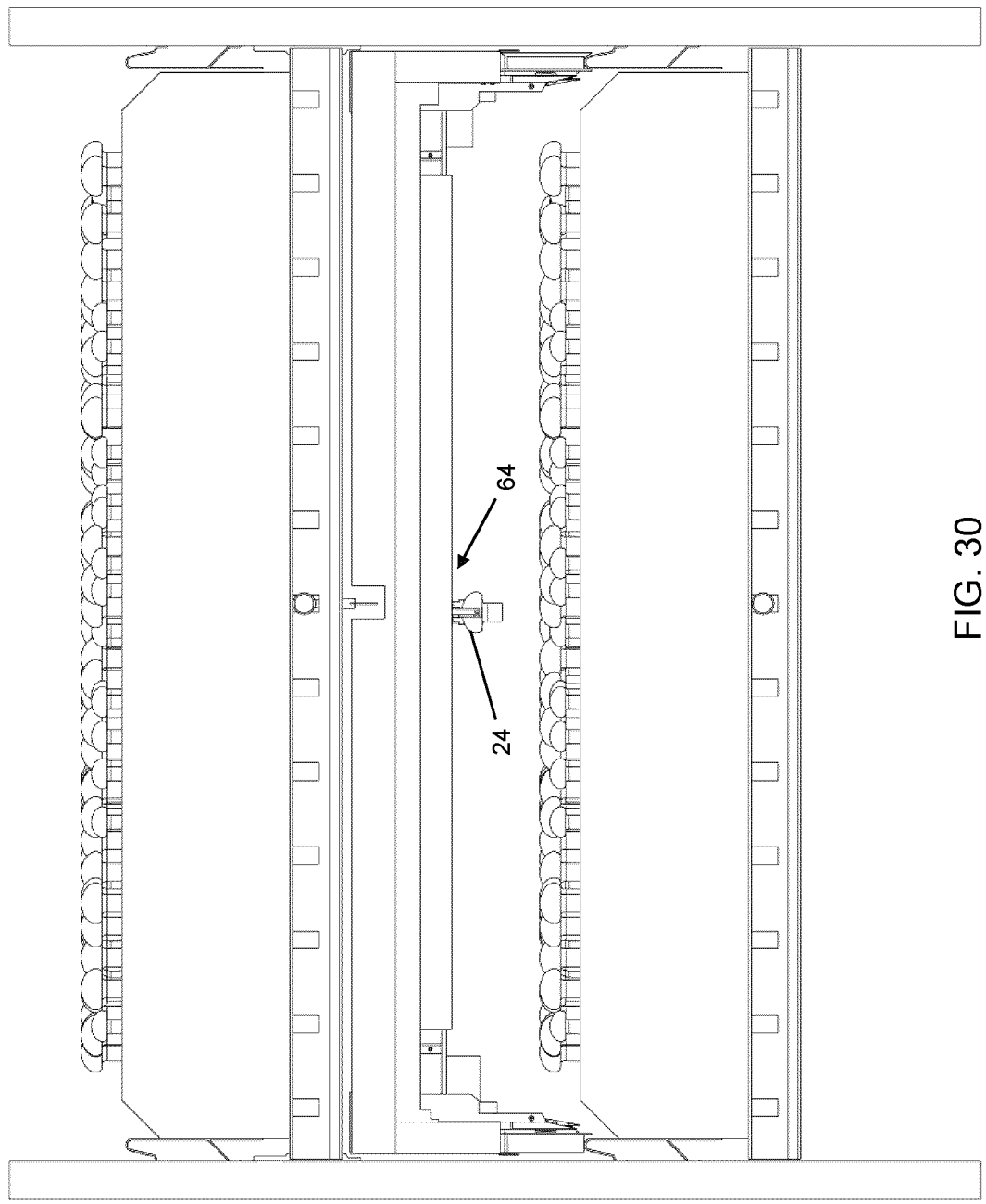
FIG. 30 is an end view of the automated harvester showing a lateral position of the gripper during the picking operation after picking a mushroom.
Figure 31:
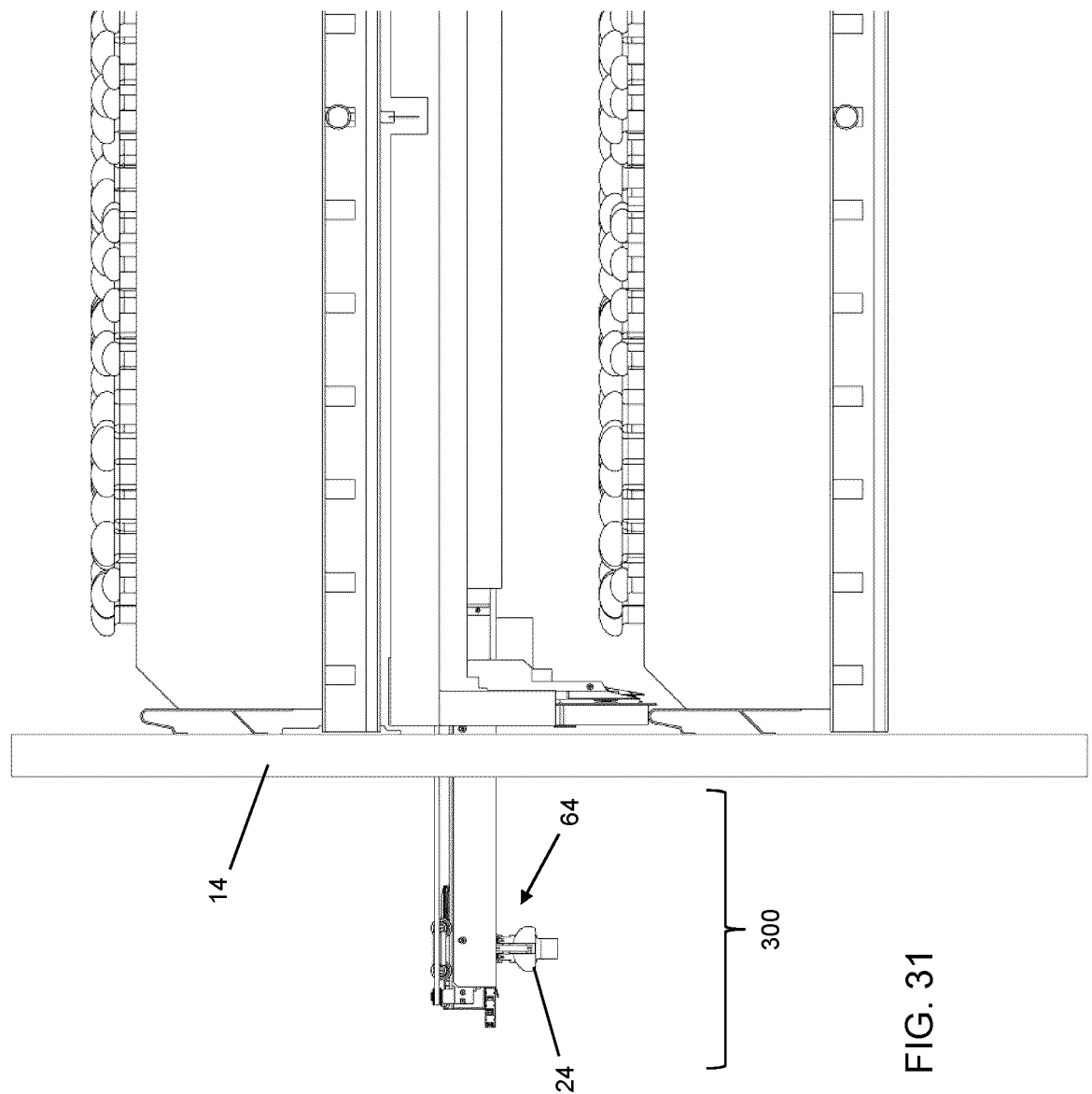
FIG. 31 is a partial end view of the automated harvester showing the lateral position of the gripper at a drop-off location outside of the bed layer.

FIG. 30 provides a zoomed out end view of a mushroom 24 being transported along the gantry's Y axis, and FIG. 31 illustrates the telescoped position of the Y axis beyond the extents of the bed to enable the mushroom 24 to be delivered to a drop off location 300 outside the bed. FIG. 31 illustrates an outermost position and in this configuration can be up to 375 mm on either side of the automated harvester 20. The drop off location 300 can be the location for another robot, a packaging box, or a human hand to package the picked mushroom 24.

As described above, the automated harvester 20 can operate the vision system rail 50 and picking system 52 to scan and pick any and all mushrooms 24 grown using an existing multi-layer assembly 10. The process of harvesting in a growing room typically begins with the early forming of mushrooms 24 on the growing bed, i.e. on the growing medium or substrate 22. Specific mushrooms 24 are known to grow quicker than other mushrooms 24 and, as such, the apparatus needs to travel the beds at the different levels 12 to harvest the isolated early mushrooms 24. From this point on, the plan can be formed to operate a continuous travel path over the beds, monitoring the growth of the mushrooms 24 and harvest off mushrooms 24 once they reach optimal size. A single automated harvester 20 can be deployed at one level 12 after another, or multiple harvesters 20 can be deployed on multiple levels 12 at the same time and used individually to scan and target mushrooms 24 for picking.

The automated harvester 20 can be brought into a mushroom 24 growing room using a lift (not shown), which can also function as a carrying cart. The lift can be attached to the bed frames by a rack and pinion mechanism. A drive motor on the lift can be used to index up and down the rack to raise and lower to the different levels 12. The controller on the lift can position the lift to be parallel with a specified level 12 of the mushroom bed so that the harvester 20 can drive off the lift and onto the side rails 16 of the mushroom bed as illustrated in FIG. 2.

As the automated harvester 20 drives from the lift onto the mushroom bed side rails 16, the vision system rail 50 moves along the bed to scan the mushrooms 24 growing on the substrate 22 and generates a 3D point cloud of the mushroom bed section that was scanned. The data acquired from the scanners 100 can be sent to a local processor unit and/or can also be sent to a centralized server or host computer (not shown). The data collected by the centralized server may be used for optimization of the harvesting process. The local processor applies filters and user parameters to determine the optimal picking strategy. Once a section is finished being scanned the local processor unit determines if there are any candidates to harvest in the section based on the scanned data it received. If there are no candidate mushrooms 24 to harvest the harvester continues scanning the next target section and repeats the process until it reaches the physical end of the bed level. Once the end of the bed level has been reached the harvester reverses back to the lift without scanning. The Lift then raises or lowers the harvester to a new bed level and the process repeats.

When the local processor unit determines that there was at least one candidate mushroom 24 within in the scanned section, the local processor unit instructs the harvester 20 to move and stop over that section and harvest the mushroom(s) 24. The strategy to detach the mushroom from the soil (substrate) incorporate several factor including, but not limited to, finger placement, angle of approach, mushroom shape, mushroom diameter, mushroom height, mushroom pivot point, and action(s) to perform (e.g., twist, pull, tilt, push). To harvest a mushroom the fingers 74 are positioned within the work area above the mushrooms 24 and the gantry lowers them to grab mushroom with the fingers 74 and execute the appropriate strategy. After the mushroom 24 has been detached from the soil (substrate 22) it is raised back into the work area (mushroom is still held by the fingers 74 so it can freely travel to the side of the harvester 20 and the drop off zone 300. It should be noted that only candidate mushrooms are harvested not all the mushrooms. Using the detected natural growth rate of the mushroom, when the harvester 20 returns to a specific section mushroom which were not candidates to harvest originally will become candidates in future passes.

Figure 32:
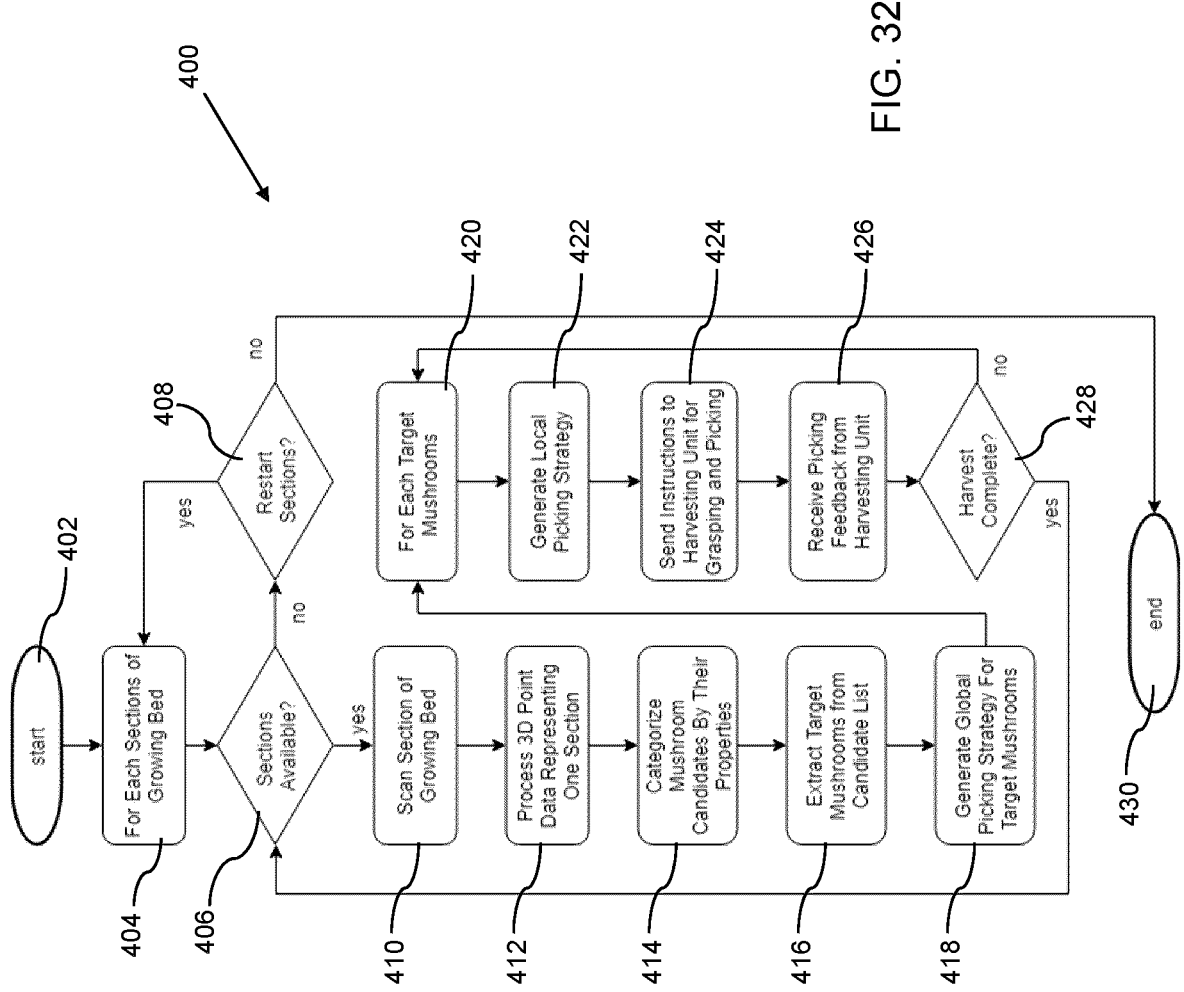
FIG. 32 is a flow chart illustrating a set of computer executable operations performed in an example of a scanning and picking sequence implemented by the automated harvester.

FIG. 32 illustrates computer executable instructions that may be executed to perform a scanning and picking sequence 400 by a processor (e.g. the above-noted processing unit). At step 402 the process initiates a sequence for a section of the growing bed 404 and determines at step 406 if there are any sections available. If not, the processor determines if any sections should be restarted at step 408. If a section is available to be scanned that section is scanned at step 410 and this generates a 3D point cloud that is processed at step 412 for data representing that section. At step 414 the processor categorizes mushroom candidates by their properties (determined from the 3D point cloud acquired using the multiple scanners 100) and the processor extracts target mushrooms 24 from the candidate list at step 416. Then, at step 418, a global picking strategy is generated for the target mushrooms 24. At step 420, for each target mushroom 24, the processor generates a local picking strategy at step 422 and sends instructions to the automated harvester 20 at step 424 for grasping and picking. The harvester 20 provides feedback on the picking operation at step 426 and the processor determines if the harvest is complete at step 428. If not, target mushrooms 24 are picked by returning to step 420. If so, the processor returns to step 406 until there are no sections available. Once there are no sections to be restarted the process ends at step 430.

For data and statistics collection operations, the local processing unit can enter a scanning mode, initialize the harvesting with behavior parameters and instruct the harvester 20 to move a pre-determined length or section over the bed.

During the scanning motion, the local data processing unit instructs the 3D scanners 100 to capture and transfer data using data routers in the vision system rail 50. The local processing unit can capture and interpret the data received from the 3D scanners 100 to obtain the XYZ point cloud while the system is in motion.

Once the scanning motion is completed by the harvester 20, the data transfer is completed, and data processing begins. Using the point cloud data, mushroom candidates and their features such as position, size, shape, orientation, volume, mass, and surrounding empty or occupied space is extractable with high precision and repeatability. By combining the mushroom bed ground information with the mushroom cap features both extracted from the point cloud, mushroom stem height, orientation, and pivot point are also available. With the mushroom parameters extracted for all mushrooms within a section, the process can be repeated for the remainder of section on the bed, from which mushroom statistics can be calculated. The data can also used to predict growth rates and locations of mushrooms allowing for the optimization of the harvest yield, speed, and quality. For the mushroom harvesting operation, the same procedure is repeated as described above for data collection but with the addition of calculating global and local strategies for picking. Upon the extraction of the mushroom features, a filtering stage can be performed to extract the mushrooms 24 that satisfy the requirements set by predetermined or predictive parameters.

With a list of target mushrooms 24 per section of the growing bed, the local processing unit can calculate a global strategy that specifies the order of picking which is to be performed by the harvesting unit, taking mushroom cluster density, surrounding space, and timing into consideration as discussed above and shown in FIG. 32. For each mushroom 24 in that global picking order, the local processing unit calculates local strategies that determine the precise picking strategy required to pick the mushroom in the most optimal way while minimizing external contact and damage that may appear of the mushroom upon contact. The local strategy for each mushroom 24 can include calculating the optimal picking approach, points of contact with the harvesters grasping technology, picking motion, and picking direction. The local strategy is transferred over to the harvesting unit along with the mushroom features, where the harvesting unit performs the instructed task and provides the picking outcome feedback to the local processing unit. The local processing unit has the ability to control to harvesting unit drop off location and procedure for the mushrooms 24 that have been picked. The process is repeated for the remainder of the mushrooms selected by the global strategy, and then repeated for the remainder of the sections that have been selected.

It can be appreciated that the automated harvester 20 can also include a human machine interface (not shown), which can be configured as a control panel that is mounted on the harvester 20. The interface can also have a portable wireless equivalent called a control client. The interface displays current information about the harvester 20 such as current status, power levels, warnings or errors, etc., while providing the ability to control most actions of the harvester 20. Both local and portable versions of the interface can include emergency stop buttons for safety precautions which halt all physical motion on the device when pressed. The portable control client can be useful when the harvester 20 is out of reach and an unexpected situation occurs. The local control panel can interact with the user for modes such as pick assist where the machine can pause or request user interaction such as changing fingers or battery.

It can also be appreciated that the automated harvester 20 described herein differentiates itself from prior attempts at automated mushroom harvesting by arranging one or more scanners 100 as shown in FIG. 15 to cover the width of the mushroom growing bed, instead of the use of single, movable, or multiple 2D cameras as used in prior attempts. In addition, the present method processes 3D point data to extract mushroom information and their precise properties instead of using image processing techniques to process optical information extracted from 2D images. The presented apparatus does no rely on the optical properties of mushrooms captured by cameras, i.e. the color, intensity, and optical features but rather the pure geometrical data of the mushroom growing bed including the ground, immature mycelium formations, mushrooms, and any other formation or object that may appear.

The automated harvester 20 described herein also does not need to rely on environmental conditions such as ambient light variations, i.e. can work with artificial or natural light and without the presence of environmental light. The present apparatus and its arrangement of 3D scanners 100 provides several areas of scanner overlap therefore overcoming issues of mushroom self-occlusion. By processing 3D data instead of 2D data, the apparatus described herein can consistently extract precise geometric information for the whole mushroom cap surface, partial stem surface, the empty or occupied space surrounding the mushroom, and the ground on which it grows on instead of simply the 2D/3D mushroom centroid and their diameter as per prior attempts. The present solution can also calculate the approach, gripper-to-mushroom contact points, and global and local mushroom pick strategies with the highest precision without the need for any additional measuring devices to assist the grasping and picking of the mushrooms. The present system reduces grasping contact forces and the chance of collision with neighboring mushrooms or obstacles to a minimum during the grasping approach, contact, and picking motion.

The present solution can also use mathematical models on the captured 3D data to extract or predict the properties of mushrooms 24 such as their position, size, shapes, orientations, growth rates, volumes, mass, stem size, pivot point, and maturity. The present system can also predict the time at which the mushroom 24 will reach pre-defined maturity and optimize its picking strategy to maximize yield of said pre-define target or goal. The present system can detect the presence, position, and communicate with external devices which are used to aid the process of harvesting, e.g., control devices, packaging devices, product conveying, and product or robot transportation devices.

Unless defined otherwise, all technical and scientific terms used herein have the same meaning as commonly understood by one of ordinary skill in the art to which this technology belongs. Also, unless indicated otherwise, except within the claims, the use of "or" includes "and" and vice versa. Singular forms included in the claims such as "a", "an" and "the" include the plural reference unless expressly stated otherwise. All relevant references, including patents, patent applications, government publications, government regulations, and academic literature are hereinafter detailed and incorporated by reference in their entireties. In order to aid in the understanding and preparation of the system, method and apparatus described herein, the above illustrative, non-limiting, examples are provided.

The term "comprising" means any recited elements are necessarily included and other elements may optionally be included. "Consisting essentially of" means any recited elements are necessarily included, elements that would materially affect the basic and novel characteristics of the listed elements are excluded, and other elements may optionally be included. "Consisting of" means that all elements other than those listed are excluded. Embodiments defined by each of these terms are within the scope of the claimed appended hereto.

The term "about" modifying any amount refers to the variation in that amount encountered in real world conditions of producing materials such as polymers or composite materials, e.g., in the lab, pilot plant, or production facility. For example, an amount of an ingredient employed in a mixture when modified by about includes the variation and degree of care typically employed in measuring in a plant or lab producing a material or polymer. For example, the amount of a component of a product when modified by about includes the variation between batches in a plant or lab and the variation inherent in the analytical method. Whether or not modified by about, the amounts include equivalents to those amounts. Any quantity stated herein and modified by "about" can also be employed in the present system, method and apparatus, as the amount not modified by about.

In this specification and in the claims that follow, reference will be made to a number of terms that shall be defined to have the meanings below. All numerical designations, e.g., dimensions and weight, including ranges, are approximations that typically may be varied (+) or (−) by increments of 0.1, 1.0, or 10.0, as appropriate. All numerical designations may be understood as preceded by the term "about".

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

The properties of mushrooms include their position within the mushroom growing bed (i.e. their coordinates), size of the mushroom cap, shapes of the mushroom caps, orientations of the mushrooms (tilted, straight and so forth), growth rates, volumes, mass, stem size, pivot point, maturity, and surrounding space (distance between mushrooms).

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the automated harvester 10, any component of or related thereto, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. An automated harvester, comprising:
   a frame;
   a vision system supported by a rail at one end of the frame, the vision system configured to scan a growing bed under the frame; and
   a picking system moveable within a working area defined by the frame, the picking system comprising a plurality of flexible fingers for gripping mushrooms, the flexible fingers being controlled by the picker to move towards and away from each other, each finger being configured to conform around a cap of the mushroom in response to pressure applied against a portion of the fingers by the mushroom during a picking operation.

2. The harvester of claim 1, further comprising a battery rail supported by the frame, the battery rail comprising at least one battery source for powering the automated harvester.

3. The harvester of claim 1, further comprising a gantry for permitting movement of the picking system during picking operations.

4. The harvester of claim 3, wherein the gantry is configured to move the picking system in vertical, lateral and longitudinal directions.

5. The harvester of claim 1, further comprising a processing unit for capturing data using the vision system, generating a picking sequence from the captured data, and instructing the automated harvester to move along the growing bed to perform scanning and picking operations.

6. The harvester of claim 5, wherein the vision system comprises:
   a rail sized to extend across a growing bed and be supported above the growing bed by a frame of the automated harvester;
   a plurality of 3D scanners spaced along the rail, each 3D scanner comprising:
      a laser;
      a slot to permit a laser line to be directed by the laser towards the underlying growing bed;
      at least one camera to capture data detectable from the laser line emitted from the slot; and
   a processing unit to process the captured data.

7. The harvester of claim 1, wherein the vision system is configured to generate a picking sequence based on the captured data, the picking sequence comprising a set of instructions for a picking system of the automated harvester.

8. The harvester of claim 1, wherein the picking system comprises a gripper, the gripper comprising a plurality of servo-driven elements to provide multiple degrees of freedom of motion in addition to the vertical translation.

9. The harvester of claim 8, wherein the servo-driven elements provide four degrees of freedom.

10. The harvester of claim 8, wherein the fingers are detachable from a body of the gripper.

11. The harvester of claim 1, wherein each finger further comprises an outer beam connected to the tip, and a base connecting and separating the inner and outer beams.

12. A picking system for an automated harvester for mushrooms, the picking system comprising:
   a gantry coupled to a frame of the automated harvester, the gantry permitting translation of the picking system in a plurality of directions, including vertical translation;
   a gripper comprising a plurality of servo-driven elements to provide multiple degrees of freedom of motion in addition to the vertical translation; and
   a plurality of fingers for gripping mushrooms, the fingers being controlled by the gripper to move towards and away from each other, each finger being configured to conform around a cap of the mushroom in response to pressure applied against a portion of the fingers by the mushroom during a picking operation.

13. The picking system of claim 12, wherein the servo-driven elements provide four degrees of freedom.

14. The picking system of claim 12, wherein the fingers are detachable from a body of the gripper.

15. The picking system of claim 12, further comprising a finger cot for each finger.

16. The picking system of claim 12, wherein each finger further comprises an outer beam connected to the tip, and a base connecting and separating the inner and outer beams.

17. The picking system of claim 12, wherein the gantry further permits lateral translation of the picking system across a bed of mushrooms.

18. The picking system of claim 12, wherein the gantry comprises a belt driven leadscrew coupled to the gripper to enable the vertical translation.

19. The picking system of claim 12, wherein the gantry further permits longitudinal translation of the picking system to permit movement along the bed.

20. A method of harvesting mushrooms using an automated harvester, comprising:
   instructing the automated harvester to move along a growing bed to scan mushrooms in the growing bed using a vision system comprising a plurality of 3D scanners spaced along a rail of a frame of the harvester;
   capturing data from the 3D scanners;
   generating a 3D point cloud from the captured data;
   using the 3D point cloud to identify candidate mushrooms and generate a picking sequence;
   instructing the automated harvester to move along the growing bed and to operate a picking system to target candidate mushrooms in the picking sequence; and
   for each candidate mushroom, controlling fingers of a gripper to move towards and away from each other, each finger being configured to conform around a cap of the mushroom in response to pressure applied against a portion of the fingers by the mushroom during a picking operation.

21. The method of claim 20, wherein the instructing comprises moving the picking system using a gantry during picking operations.

22. The method of claim 21, wherein the gantry is configured to move the picking system in vertical, lateral and longitudinal directions.

23. The method of claim 20, wherein the vision system comprises:
   a rail sized to extend across a growing bed and be supported above the growing bed by a frame of the automated harvester;
   a plurality of the 3D scanners spaced along the rail, each 3D scanner comprising:
      a laser;
      a slot to permit a laser line to be directed by the laser towards the underlying growing bed;
      at least one camera to capture data detectable from the laser line emitted from the slot; and
   a processing unit to process the captured data.

24. The method of claim 20, wherein the vision system is configured to generate the picking sequence based on the captured data, the picking sequence comprising a set of instructions for the picking system of the automated harvester, the method further comprising having the vision system instruct the picking system.

25. The method of claim 20, wherein the gripper comprises a plurality of servo-driven elements to provide multiple degrees of freedom of motion in addition to the vertical translation.

26. The method of claim 25, wherein the servo-driven elements provide four degrees of freedom.

27. The method of claim 25, wherein the fingers are detachable from a body of the gripper.

28. The method of claim 20, wherein each finger further comprises an outer beam connected to the tip, and a base connecting and separating the inner and outer beams.

29. A non-transitory computer readable medium comprising computer executable instructions for harvesting mushrooms using an automated harvester, comprising instructions for
  instructing the automated harvester to move along a growing bed to scan mushrooms in the growing bed using a vision system comprising a plurality of 3D scanners spaced along a rail of a frame of the harvester;
  capturing data from the 3D scanners;
  generating a 3D point cloud from the captured data;
  using the 3D point cloud to identify candidate mushrooms and generate a picking sequence;
  instructing the automated harvester to move along the growing bed and to operate a picking system to target candidate mushrooms in the picking sequence; and
  for each candidate mushroom, controlling fingers of a gripper to move towards and away from each other, each finger being configured to conform around a cap of the mushroom in response to pressure applied against a portion of the fingers by the mushroom during a picking operation.

* * * * *